United States Patent
Leskovec et al.

(10) Patent No.: US 12,533,607 B2
(45) Date of Patent: Jan. 27, 2026

(54) MULTIMODAL METAL AFFINITY PROCESSING AAV CAPSIDS

(71) Applicant: Sartorius BIA Separations d.o.o., Ajdovscina (SI)

(72) Inventors: Maja Leskovec, Ajdovscina (SI); Sara Drmota Prebil, Ajdovscina (SI); Rok Zigon, Ajdovscina (SI); Ales Strancar, Ajdovscina (SI); Peter S. Gagnon, Las Vegas, NV (US)

(73) Assignee: Sartorius BIA Separations d.o.o., Ajdovscina (SI)

( * ) Notice: Subject to any disclaimer, the term of this patent is extended or adjusted under 35 U.S.C. 154(b) by 389 days.

(21) Appl. No.: 18/021,437

(22) PCT Filed: Aug. 18, 2021

(86) PCT No.: PCT/EP2021/072877
§ 371 (c)(1),
(2) Date: Feb. 15, 2023

(87) PCT Pub. No.: WO2022/038164
PCT Pub. Date: Feb. 24, 2022

(65) Prior Publication Data
US 2023/0294017 A1  Sep. 21, 2023

(30) Foreign Application Priority Data

Aug. 18, 2020 (EP) ............... 20191583
Oct. 19, 2020 (EP) ............... 20202582

(51) Int. Cl.
*B01D 15/38* (2006.01)
*B01D 15/16* (2006.01)
*C12N 15/86* (2006.01)

(52) U.S. Cl.
CPC ....... *B01D 15/3828* (2013.01); *B01D 15/166* (2013.01); *C12N 15/86* (2013.01); *C12N 2750/14143* (2013.01)

(58) Field of Classification Search
CPC ............ B01D 15/3828; C12N 15/8645
See application file for complete search history.

(56) References Cited

U.S. PATENT DOCUMENTS

2019/0255513 A1  8/2019  Scanlon

FOREIGN PATENT DOCUMENTS

| JP | 2000-510682 A | 8/2000 |
|---|---|---|
| JP | 2018-046820 A | 3/2018 |
| JP | 2019-527058 A | 9/2019 |
| WO | 96-27677 A2 | 9/1996 |
| WO | 2004-113494 A2 | 12/2004 |
| WO | 2011-094198 A1 | 8/2011 |
| WO | 2018-011599 A1 | 1/2018 |
| WO | 2019-178495 A1 | 9/2019 |
| WO | 2019-242535 A1 | 12/2019 |

OTHER PUBLICATIONS

Burova et al. (Gene Therapy 2005, 12, S5-S17). "Chromatographic purification of recombinant adenoviral and adeno-associated viral vectors: methods and implications" (Year: 2005).*
Koerber et al. (Human Gene Therapy, Apr. 2007, 18, 367-378). "Engineering Adeno-Associated Virus for One-Step Purification via Immobilized Metal Affinity Chromatography" (Year: 2007).*
Office Action from corresponding Japanese Patent Application No. 2023-512396 dated Apr. 2, 2024.
Burova et al., "Chromatographic purification of recombinant adenoviral and adeno-associated viral vectors: methods and implications", Gene Ther., vol. 12, p. S5-S17, (Oct. 2005).
Lee et al., "Improved Purification of Recombinant Adenoviral Vector by Metal Affinity Membrane Chromatography", Biochemical and Biophysical Research Communication, vol. 378, p. 640-644, (2009).
Qu et al., "Separation of adeno-associated virus type 2 empty particles from genome containing vectors by anion-exchange column chromatography", Journal of Virological Methods, vol. 140, p. 183-192, (Feb. 2007).
International Search Report for corresponding Patent Application No. PCT/EP2021/072877 dated Nov. 19, 2021.

* cited by examiner

Primary Examiner — Ryan B Huang
(74) Attorney, Agent, or Firm — Christensen, Fonder, Dardi; Diane E. Bennett; Peter S. Dardi

(57) ABSTRACT

A method for separating full Adeno-associated virus (AAV) capsids from empty AAV capsids in a buffered mixture comprising full AAV capsids, empty AAV capsids, comprising the steps of
contacting the buffered mixture with a first substrate bearing a metal affinity ligand attached to the first substrate, said metal affinity ligand having the ability to complex metal ions via three or more nitrogen atoms,
separating empty AAV capsids from full AAV capsids by eluting with a pH gradient, a salt gradient, a metal ion gradient or a combination thereof in the presence of multivalent cations bound to the metal affinity ligand to obtain a purified full AAV capsid fraction.
For removing contaminating DNA in the mixture or purified AAV capsid fraction, the method of the invention can be combined with contacting of the buffered mixture or the purified full AAV capsid fraction with a second substrate bearing a metal affinity ligand attached to the second substrate in the presence of multivalent cations bound to the metal affinity ligand, said metal affinity ligand comprises two or more negatively charged carboxylic acid residues.

20 Claims, 15 Drawing Sheets

MULTIMODAL METAL AFFINITY PROCESSING AAV CAPSIDS

CROSS REFERENCE TO RELATED APPLICATIONS

This application is a National Stage filing of PCT Application No. PCT/EP2021/072877 filed Aug. 18, 2021, entitled "Multimodal Metal Affinity Processing AAV Capsids", which claims priority to European Patent Application No. 20191583.2, filed Aug. 18, 2020 and European Patent Application No. 20202582.1 filed Oct. 19, 2020.

The method of the invention is related to an improved method for separating full AAV capsids from empty AAV capsids and contaminating DNA.

BACKGROUND

Adeno-associated virus (AAV) has emerged as a popular candidate for packing and delivery of DNA plasmids in the field of gene therapy. This has led to many materials and methods being evaluated or developed to purify them. Affinity chromatography is popular because it is operationally simple. Most commonly, a biological ligand, such as derived from an antibody, is immobilized on a solid phase chromatography surface. It is exposed to a crude sample containing the desired AAV and contaminants. In principle, AAV binds, contaminants do not. The unbound contaminants are washed away. The AAV is recovered by chemically disrupting the interaction between the ligand and the AAV.

Immobilized metal affinity chromatography (IMAC) has been recognized as an effective surrogate for biological affinity in many cases [1,2]. The practice is known of genetically coding a poly-histidine tail (His-tag) onto a protein so that it can be captured by nickel ions immobilized on an iminodiacetic acid (IDA) ligand, or on a nitrilotriacetic acid (NTA) ligand. Such His-tags commonly contain 6 or more histidyl residues in linear sequence. IMAC purification of His-tagged AAV is known [3,4]. The technique of IMAC for capture of non-His-tagged AAV is understood not to have practical utility [3,4] since, otherwise, there would be no need to code a His-tag onto the AAV. The use of IMAC for purification of nucleic acids is known [5,6].

No His-tag products purified by IMAC are known to have been licensed by international regulatory authorities, possibly reflecting the fact that the nickel ions most commonly recommended to capture his-tagged proteins are carcinogenic. Complete nickel removal from the final product is difficult to achieve and more difficult to prove because they bind so strongly to the tags, and potentially to other sites on the proteins. Toxic metals also inflate costs for hazardous waste-disposal and they are a concern for persons working with IMAC-nickel columns. Heavy-metal ions like nickel remain bound to proteins even at saturating levels of sodium chloride or guanidinium hydrochloride. Chelating agents may reduce their levels but chelating agents threaten the stability of AAV capsids, which require magnesium and/or calcium ions to maintain their structural integrity.

Another limitation of affinity chromatography, including both bioaffinity chromatography and IMAC, is that affinity fails to fully address the purification requirements of AAV. It indiscriminately captures capsid debris, defective capsids, and empty capsids, along with the desired full capsids containing the intended internal payload of therapeutic plasmid DNA. The term "empty capsids" refers to AAV capsids which do not contain the gene therapy DNA plasmid intended for delivery to the patient. The terms "capsid debris" and "defective capsids" refer to capsids that are incomplete or non-functional owing to incorrect assembly or damage.

A further limitation of affinity chromatography is that it fails to remove contaminating DNA to sufficiently low levels necessary to ensure patient safety and compliance with regulatory authorities. Contaminating DNA may be in the form of host-cell derived DNA or it may be plasmid DNA outside the capsids. AAV has shown a propensity to bind such DNA to its external capsid surfaces, leading to its co-purification by affinity methods. This non-specifically bound DNA on the capsid exteriors also interferes with follow-on methods to remove empty capsids.

The use of strong anion exchangers to reduce empty capsid and contaminating DNA content is known [7-9]. Empty capsid removal is effective for some AAV serotypes, partially effective for many, and offers little utility with others. Weak anion exchangers have proven to be ineffective for fractionation of empty AAV capsids from full capsids.

The term "strong anion exchangers" refers to anion exchange ligands that maintain consistent charge over the range of about pH 2 to pH 13. They are typically in the form of quaternary amines, with commercial names such as Q, QA, QAE, QAM, TEAE, TMAM, or TMAE, referring respectively to quaternary, quaternary amino, quaternary aminoethyl, quaternary aminomethyl, triethylaminoethyl, trimethylaminomethyl, or trimethylaminomethyl.

The term "weak anion exchangers" refers to anion exchange ligands that lose charge at high pH values. They are most commonly in the form of tertiary amines, the most common of which is DEAE (diethylaminoethyl). DEAE has no significant utility for capsid separation because such separation generally requires alkaline pH values close to pH 9 or above where DEAE has lost most of its charge. Even to the extent it might be able to fractionate the desired capsids from the undesired capsids to a significant degree, its loss of charge in the necessary pH range reduces its capacity to a point where the separation has no practical value for manufacturing. This is especially true in the context of superior performance by strong anion exchangers.

Cation exchange chromatography is known to achieve little or no practical separation of empty capsids from the desired full capsids. To the extent it provides any separation at all, it is inferior to the separation offered by strong anion exchangers.

Borates are sometimes referred to as synthetic lectins because of their ability to form covalent complexes with certain hydroxyl configurations on a variety of carbohydrates and glycosylated compounds. Borate complexes with cis-diols endow the complex with a negative charge [10]. Borates can also alter metal ion selectivity of metal chelating sites [11].

SUMMARY OF THE INVENTION

A method has been developed using an immobilized metal affinity chromatography (IMAC) ligand that has the surprising ability to capture AAV that lacks a His-tag or other genetic modifications to facilitate binding to immobilized metal ions. It requires the use of a cationic metal affinity ligand. It does does not require the use of toxic heavy metals. It is effective with multivalent metal cation species that are essential for human physiology.

The method provides the further surprising abilities of fractionating empty capsids from full capsids and of reducing DNA contamination more effectively than known methods for doing so. The abilities of the basic method of the invention are compounded by combination with methods to further reduce the content of empty capsids and/or DNA, such as by combination with the method of anion exchange chromatography, density-gradient centrifugation, or other techniques.

In one aspect the invention pertains to a method for separating full Adeno-associated virus (AAV) capsids from empty AAV capsids in a buffered mixture comprising full AAV capsids empty AAV capsids, comprising the steps of
  contacting the buffered mixture with a first substrate bearing a metal affinity ligand attached to the first substrate, said metal affinity ligand having the ability to complex metal ions via three or more nitrogen atoms,
  separating empty AAV capsids from full AAV capsids by eluting with a pH gradient, a salt gradient, a metal ion gradient or a combination thereof in the presence of multivalent cations bound to the metal affinity ligand to obtain a purified full AAV capsid fraction. In the following, for the sake of simplicity the expression "metal affinity ligand having the ability to complex metal ions via three or more nitrogen atoms" is also referred to "cationic ligand-metal solid phase".

In an embodiment of the method of the invention the first substrate is loaded with multivalent cations prior to contacting the buffered mixture with the first substrate, during contacting the buffered mixture with the first substrate and/or during eluting.

In a further embodiment of the method of the invention the solid phase substrate can be equilibrated with a buffer having an alkaline pH.

In yet another embodiment of the method of the invention the metal affinity ligand of the first substrate is selected from the group consisting of diethyltriamine; triethyltetramine; tetraethylpentamine; polyamidoamine, polytriethylamine, deferoxamine, N,N-Bis(2-aminoethyl)-1,2-ethanediamine, and Tris(2-aminoethyl)amine (TREN).

In still another embodiment of the method of the invention the multivalent metal cation present during eluting can be selected from the group consisting of iron(III), manganese(II), copper(II), zinc(II), cobalt(II), magnesium(II), calcium(II), barium(II), nickel(II) and combinations thereof. In particular, copper(II), magnesium(II), calcium(II), or a combination thereof can be used. In one embodiment of the method of the invention the metal affinity ligand can be charged with one species of multivalent cations before eluting and the AAV capsids may be eluted by increasing the concentration of a second species of multivalent metal cation.

In a further embodiment of the method of the invention the elution gradient is performed by applying an increasing concentration of multivalent metal cations. The concentration of multivalent cations at the gradient endpoint may be in the range of 0.1 mM to 200 mM, or 1 mM to 100 mM, or 2 mM to 50 mM, or 5 mM to 25 mM. In some embodiments, the species of multivalent ions may be magnesium, calcium, or barium, or copper, or a mixture thereof.

In yet another embodiment of the method of the invention the salt concentration in the gradient buffer for separating by eluting full AAV capsids and empty AAV capsids may be in a range of up to 500 mM. Typically, eluting is performed by increasing the concentration of a salt in a range of 1 mM to 500 mM, 2 mM to 250 mM, 3 mM to 125 mM, 5 mM to 60 mM, or 7 mM to 30 mM.

The salt ranges for any given AAV serotype will need to be determined experimentally since each serotype has different surface chemistry features. This phenomenon is well known in the field of ion exchange chromatography where some serotypes bind more strongly than others and require more salt for removal. The amount of salt required for elution will also be dependent on pH but the pattern of pH dependency will be different for cationic metal affinity substrates than for strong anion exchangers. Binding becomes stronger on strong anion exchangers with increasing pH. The strongest binding on TREN occurs at approximately neutral pH and becomes weaker at both higher and lower pH values. This means that more salt will be required for elution at pH 7 than at either pH 6 or pH 9. At pH 7, a gradient endpoint of at least 500 mM NaCl will be appropriate. At pH 9, a gradient endpoint of less than 250 mM will be adequate, as will also be the case at pH 6. The concentration of salt will also vary with the choice of metal ion bound to the cationic metal affinity substrate. The concentration of salt required to elute capsids when copper is bound to the cationic metal affinity substrate will generally be lower than most other metals by a factor of about 3.

In a further embodiment of the method of the invention the pH of the gradient buffer for separating full AAV capsids and empty AAV capsids can be in the range of pH 6.0 to pH 10, pH 7.0 to pH 9.75, or pH 8.0 to pH 9.5, or pH 8.5 to pH 9.5, or pH 9.0 to pH 9.5, or pH 8.75 to pH 9.25, or pH 8.9 to pH 9.1, or pH 8.95 to pH 9.05, or pH 8.75 to pH 9.25. Elution pH is downshifted by the presence of salts during pH gradient elution. As a rule, the greater the concentration of salts, the greater the reduction of pH at which capsids will elute. It is understood by the person skilled in the art, that exceptions from the rule are possible. Typically, capsids will elute earlier if the salts are present at a concentration of 25 mM than if they are available at concentration of 10 mM, and so on. Salt concentration may be held constant during pH gradient elution or it may be varied independently.

In yet a further embodiment of the method the invention contaminating DNA present in the buffered mixture or purified full AAV capsid fraction can be removed by binding the DNA to the first and/or second substrate. A variation of the method of the invention has been developed that exploits the surprising further finding that, in some embodiments, under the same conditions used to fractionate capsids on a cationic ligand-metal solid phase as the first substrate, AAV capsids fail to bind to a second substrate bearing a metal affinity ligand attached to the second substrate, which metal affinity ligand comprises two or more negatively charged carboxylic acid residues, but DNA binds. For the sake of simplicity the term "second substrate bearing a metal affinity ligand attached to the second substrate, which metal affinity ligand comprises two or more negatively charged carboxylic acid residues" will also be referred to as "anionic ligand metal solid phase".

Combining the step of the cationic metal affinity ligand with a step performed on an anionic metal affinity ligand achieves a greater reduction of DNA contamination. If applied in advance of treatment with the first substrate, second-substrate treatment may increase capsid binding capacity of the first substrate.

The contacting of the buffered mixture or the purified full AAV capsid fraction with a second substrate bearing a metal affinity ligand attached to the second substrate is performed in the presence of multivalent cations bound to the metal affinity ligand, said metal affinity ligand comprises two or more negatively charged carboxylic acid residues. It is also possible to treat the buffered mixture simultaneously with the first substrate (cationic ligand metal silid phase) and the second substrate anionic ligand metal solid phase).

Therefore, in a second aspect the invention pertains to a wherein the buffered mixture can be pre-treated by contacting the buffered mixture with a second substrate bearing an anionic metal affinity ligand loaded with a metal whereby the full AAV capsids are not bound by the second substrate.

In some embodiments, the conditions to which the first substrate is equilibrated may differ from the conditions to which the second substrate is equilibrated.

In a further embodiment of the method of the invention contaminating DNA present in the buffered mixture may be removed by binding it to the second substrate.

In still a further embodiment of the method of the invention the anionic metal affinity ligand can be selected from the group consisting of amino-dicarboxylic acids or amino tricarboxylic acids.

In yet a further embodiment of the method of the invention the amino-dicarboxylic acid can be iminodiacetic acid (IDA).

In another embodiment of the method of the invention the amino-tricarboxylic acid is nitrilotriacetic acid (NTA).

In still another embodiment of the method of the invention the second substrate is equilibrated with a buffer in the range of pH 6.0 to pH 10.0, or pH 7.0 to pH 9.5, or pH 8.0 to pH 9.25, or pH 8.5 to pH 9.0, or pH 8.75 to pH 9.25, or pH 8.9 to pH 9.1 or pH 8.95 to pH 9.05, in particular a pH in the range of pH 8.75 to pH 9.25.

In yet another embodiment of the method of the invention the salt concentration of a buffer to prevent binding of full AAV capsids to the second substrate is in the range of up to 1 M, or 0.1 mM to 1.0 M, or 1 mM to 500 mM, or 2 mM to 250 mM, or 5 mM to 250, or 3 mM to 125 mM, or 10 mM to 125 mM, or 5 mM to 60 mM, or 20 to 62, or 7 mM to 30 mM.

In a further embodiment of the method of the invention the buffer for equilibrating the first substrate and/or a buffer for separating empty AAV from full AAV comprise metal ions having at least two positive charges, preferably selected from the group consisting of calcium, magnesium, copper (cupric), iron (ferric), manganese, zinc, barium, nickel, cobalt, and combinations thereof. In a further embodiment of the method the invention, the buffer for equilibrating the first substrate employs a different species of multivalent metal cation than a species of metal cation employed to elute the capsids.

The overall effectiveness of the cationic metal affinity step and its combination with the anionic metal affinity step can be increased by placing one or both in the context of complete multistep purification procedures.

In one non-limiting example, the method of the invention may be practiced as follows:

A chromatographic solid phase bearing the cationic metal-chelating ligand N,N-Bis(2-aminoethyl)-1,2-ethanediamine on its surface is exposed to a solution of metal cations to charge the ligand with metal cations, after which excess metal cations are rinsed away, leaving the surface of the solid phase bearing ligand:metal complexes.

The cationic metal-ligand solid phase is equilibrated to a pH of about 9 with a buffer containing excess metal ions of the same species. This is a unique feature in the field of IMAC, in two respects. The known approach is to specifically omit metal ions from the running buffers since the presence would be expected to compete with immobilized metal ions for binding sites on the target. It would also result in the eluted product containing excess metal ions, which are toxic in many examples of IMAC. The operating pH of 9.0 is also unique. Samples are normally applied to IMAC columns at near-neutral pH. This is the only known IMAC method to employ strongly alkaline pH conditions at any stage of processing.

A sample containing some combination of empty capsids, full capsids, and contaminating DNA is equilibrated to roughly the same conditions as the cationic metal-ligand solid phase.

The sample is loaded onto the cationic metal-ligand solid phase. AAV capsids are retained. Unbound contaminants are unretained and rinsed from the cationic metal-ligand solid phase.

Empty and full AAV capsids are fractionated from each other by increasing the concentration of a non-chelating-salt gradient while the pH is maintained at about 9. This is another unique feature in the field of IMAC since increasing the concentration of non-chelating salts does not elute proteins from immobilized metals at fixed pH. In this particular application, it appears that the immobilized metal ions mediate a selective weak attraction for empty capsids in a way that facilitates their separation from full capsids, while the immobilized metals also provide a high-affinity binding site for DNA.

The method is also unique as the only IMAC method known to achieve differential fractionation of any protein-containing species from any immobilized species of metal on any IMAC ligand. The field of IMAC to date has been characterized by proteins that either bind or they do not. Proteins that bind are eluted by a single step that suspends their interaction with the immobilized metal. No precedent for achieving differential elution of closely related protein-containing species has been found in the literature defining the art.

In another non-limiting example, the method of the invention may be practiced as follows:

A chromatographic solid phase bearing the anionic metal-chelating ligand iminodiacetic acid on its surface is exposed to a solution of metal cations to charge the ligand with metal cations, after which excess metal cations are rinsed away, leaving the surface of the solid phase bearing ligand:metal complexes.

The anionic metal-ligand solid phase is equilibrated to a pH of about 9 with a buffer containing excess metal ions of the same species.

A sample containing some combination of empty capsids, full capsids, and contaminating DNA is equilibrated to roughly the same conditions as the anionic metal-ligand solid phase.

The sample is loaded onto the anionic metal-ligand solid phase. AAV capsids flow through. DNA is bound.

The column is rinsed to fully recover unbound AAV capsids which are then fractionated by the method of the cationic metal-ligand solid phase described above.

DETAILED DESCRIPTION OF THE INVENTION

The cationic metal affinity ligand to practice the basic version of the invention is one from the family of amino-based derivatives bearing at least one positive charge independently from any metal cation with which it may be or become associated. The one or more positively charged amino residues may consist of one or more primary amino residues, secondary amino residues, tertiary amino residues, quaternary amino residues, imides, or imines. Cationic amino residues may include any combination of the foregoing residues in any combination or conformation. At least one of the cationic amino residues must maintain a positive charge at pH 9.0. The ligand may also include uncharged amide nitrogen residues so long as at least one positively charged amino derivative is present. Examples of cationic amino-based ligands fulfilling these requirements include diethyltriamine; triethyltetramine; tetraethylpentamine; polytriethylamine, polyamidoamine; deferoxamine, also known as deferox or desferal; and N,N-Bis(2-aminoethyl)-

1,2-ethanediamine, also known as 2,2',2''-Nitrilotriethylamine, or 2,2',2''-Triaminotriethylamine, or Tris(2-aminoethyl)amine, or TAEA, or TREN.

Any of the above cationic metal affinity ligands may be covalently bonded directly to a solid phase chromatography surface through one or more of their amino groups. They may alternatively be linked indirectly to the solid phase surface through a linear or branched polymer to make the ligand more accessible or to create a multivalent linear tentacular, branched, or dendrimeric configuration. The term dendrimeric refers to a tree-shaped branching pattern where branches diverge from other branches to produce a deep network of branches, with each branch terminus bearing the ligand. Known examples include triethylamine-terminal dendrimers (polytriethylamine, pTEA) and polyamidoamine (PAMAM) dendrimers which are available commercially from global suppliers. The same approaches can be applied to anionic metal affinity ligands.

In one embodiment, the cationic metal affinity ligand is TREN. The un-immobilized ligand includes 3 primary amine residues branching through ethyl groups from a central tertiary amine.

Figure 1:
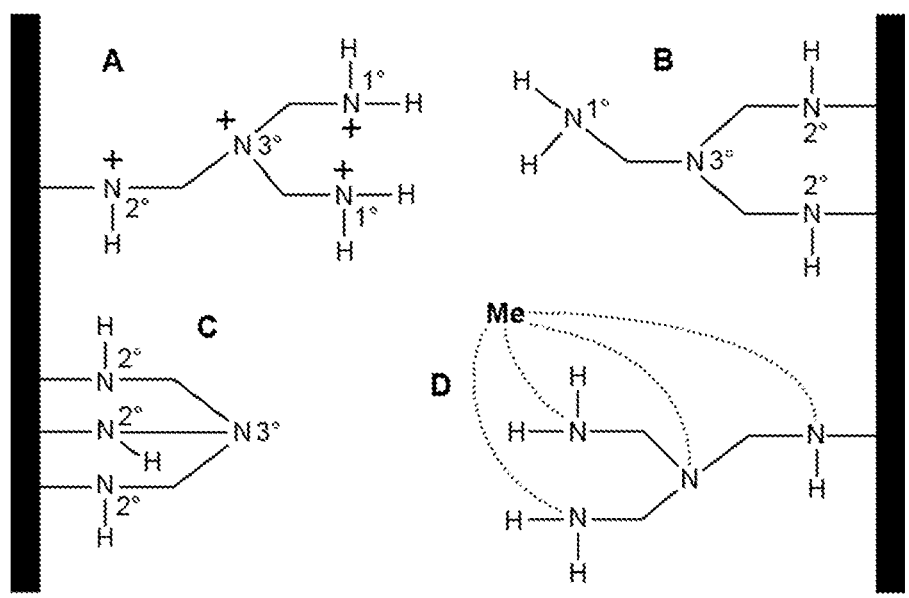
FIG. 1 depicts different immobilization configurations of TREN on a chromatographic solid phase. (A) shows the ligand bound to the solid phase through one amino group. Positive charges are shown as plus signs (+, shown only on (A). The derivatization state of each amino groups is indicated by the notation 1° for primary, 2° for secondary, and 3° for tertiary. (B) shows the ligand bound to the solid phase through two amino groups. (C) shows the ligand bound to the solid phase through three amino groups. (D) shows the single-amino-bound version (A), coordination-bonded to a metal ion.

Immobilization of the ligand on a chromatographic solid phase may produce any one or any combination of the following configurations: linkage of one primary amino residue to the solid phase, converting that residue to a secondary amino group, attached to an ethyl group attached to a tertiary amino residue, attached to two additional ethyl groups leading to terminal primary amino residues; linkage of two primary amino residues to the solid phase, converting those residues to secondary amino groups, each attached to an ethyl group leading to a tertiary amino residue, attached to another ethyl group that leads to a primary amino group; and linkage of three primary amino groups to the solid phase, each leading through an ethyl group to a central tertiary amino residue (FIG. 1).

It will be recognized by persons familiar with the art that primary amino groups, secondary amino groups, and tertiary groups are all weak anion exchange groups to varying extents according to their individual pKa values. TREN is represented in the commercial literature as maintaining a positive charge up to about pH 9. This highlights the unexpected utility of TREN since the weak anion exchanger DEAE, which also maintains a positive charge up to about pH 9, is generally recognized in the field to lack practical utility for separation of empty capsids from full capsids a.

It also highlights that the behavior of TREN is distinct in general from commonly known weak anion exchangers. This suggests that a multi-amino ligand combining combination of weak anion exchange groups in a configuration that binds multivalent metal cations contributes to the distinctive features that enable the method of the invention to achieve its unique results. Chromatographic solid phases bearing TREN are available from commercial suppliers i.e. www.bio-works.com/product/iex-resin/workbeads-tren.
Many other global suppliers of chromatography media produce and market anion exchangers, demonstrating that the technology to synthesize chromatography products suitable for practicing the method of the invention is widely available.

An anionic metal affinity ligand to practice the compound version of the invention is one from the family of amino-dicarboxylic acids that lack a positive charge exemplified by iminodiacetic acid (IDA) or amino-tricarboxylic acids that lack a positive charge exemplified by nitrilotriacetic acid (NTA).

Chromatographic solid phases bearing anionic metal affinity ligands such as IDA and NTA are widely available from all major suppliers of commercial chromatography worldwide. The method of the invention may be practiced with any, or any combination, of a wide variety of multivalent metals ions, including barium, calcium, iron, magnesium, manganese, copper, and/or zinc. This list favors nontoxic metals. Toxic heavy metals may provide positive results but their use is discouraged by the extra work they create to certify their removal from the final product. Metals with known human nutritional, therapeutic, or general health value should be favored in general and, among them, the most favored species will be the one that provides the best separation of empty and full capsids and/or best reduction of DNA for any particular AAV serotype.

In some embodiments, the buffers for equilibrating the chromatography column and for performing elution may also contain metal ions. In some such embodiments, the species of metal ion will be the same with which the solid-phase ligand is charged. In some embodiments, such buffers may be used to charge the solid phase ligand with metals instead of performing a previous step to charge the ligand with metals. In some embodiments, the species of metal ions in the equilibration and gradient buffers may be different from each other.

In some embodiments, the cationic metal affinity ligand may be charged with a multivalent metal cation before contacting the sample with the cationic metal affinity substrate. In other embodiments, the cationic metal affinity ligand may be charged with a multivalent metal cation by excess multivalent metal cations in the sample. In other embodiments, the cationic metal affinity ligand may be charged with a multivalent metal cation after contacting the sample with the cationic metal affinity substrate. In one such embodiment, the cationic metal affinity ligand may be charged with a multivalent metal cation with a wash buffer before commencing elution. In a closely related embodiment, the cationic metal affinity substrate may be charged by inclusion of a multivalent metal cation in the gradient start buffer. In another such embodiment, the cationic metal affinity substrate may be charged with a multivalent metal cation by virtue of its inclusion in the gradient endpoint buffer.

In various embodiments, full capsids may be eluted by increasing pH gradient, or by increasing salt gradient, or by increasing gradient of a multivalent metal cation.

In some embodiments, the gradient start buffer may contain a multivalent metal cation in concentration in the range of 0.0 mM to 10.0 mM, or 2.5 mM to 7.5 mM, or 4.0 mM to 6.0 mM or a lower, higher, or intermediate range. Initial screening may be conducted at about 5 mM. Based on results at this concentration, metal content can be adjusted up or down to achieve the most desirable results. The concentration of metal ions in the gradient-start buffer may be the same as the concentration of metal ions in the gradient-end buffer.

In some embodiments, metallic salts may be used as eluting agents and may be preferred because they alter the surface charge properties of the AAV capsids and improve the separation of empty capsids from full capsids. Each event in which a multivalent metal binds to a metal binding site on the surface of a capsid neutralizes an equal number of negative charges of the di-carboxy or tri-carboxy metal-binding site on the capsid. Since the negative charges contribute to the interaction with the cationic metal affinity ligand, such metal binding reduces the attraction of the capsid to the ligand. This mechanism is fundamentally different from elution with non-metallic salts since non-metallic salts work by exclusively by increasing conductivity in the bulk mobile phase as a whole. The non-metal salt ions create a dampening field that depresses ionic interactions of all kinds without respect to where charges reside, how many of them reside in close proximity to each other, or whether they are positive or negative. Elution with non-metallic salts is non-specific field phenomenon. This is fundamentally distinct from the local and specific ability of metal salts to neutralize the local charge of amino carboxyl residues associated with metal binding sites on capsid surfaces. This explains why metallic-salts are able to elute capsids at lower concentrations than non-metallic salts.

In some embodiments where elution is performed by increasing the concentration of metal ions, the gradient may cover a span from 0 mM to 200 mM, or 0 mM to 100 mM, or 0 mM to 50 mM, or 0 mM to 25 mM, or 1 mM to 25 mM, or 2 mM to 20 mM, or 5 mM to 15 mM or a lower, higher, or intermediate range. Initial screening may be conducted with a gradient range of 0 mM to 25 mM. Based on results at this concentration, metal content of the gradient-start buffer and gradient-end buffer can be adjusted up or down to achieve the most desirable results.

In some embodiments, the metal affinity ligand may be charged passively with metal ions, meaning that rather than having a discrete metal-charging step in advance of introducing the sample, the solid phase may be loaded with metals during the buffer equilibration by including metal ions in the equilibration buffer. Persons of skill in the art will recognize the term "equilibration buffer" to represent a buffer passed through a chromatography device for the purpose of creating a particular chemical environment to enable the intended use of a chromatography method.

In some embodiments, metal ions contained in the sample may convert uncharged cationic metal affinity ligands to their metal-complexed form for practicing the method of the invention. This may occur through deliberate addition of metal ions to the sample or it may occur inadvertently through metals inadvertently remaining in cell culture harvests, lysates, and partially purified samples.

It will be apparent to persons familiar with developing purification procedures that the choice of metal species may depend in part on where it is desired to place the method of the invention in an overall multi-step purification process. Experimental data show that ferric iron and manganese have higher affinity for DNA and other phosphorylated contaminants including endotoxins. This suggests that these metals may be advantageous when the method is used for polishing an already-highly-purified sample. Elevated affinity for DNA is less likely to be advantageous when iron or manganese are used to capture AAV from a crude feed stream since the high DNA content may consume an excessive proportion of the column's overall binding capacity. In such cases, a metal with lower affinity for DNA, such as but not limited to calcium or magnesium, may prove more advantageous.

In some embodiments, the efficiency of DNA removal may be enhanced by combining sample treatment with a cationic metal affinity substrate with treatment by an anionic metal affinity substrate.

In some embodiments it may be advantageous to use strong DNA-binding metal such as iron and manganese on the anionic metal affinity ligand and use an AAV-stabilizing metal such as calcium and/or magnesium on the cationic metal affinity ligand.

The method of the invention as it pertains to the cationic metal affinity ligand may be practiced at a pH value in the range of pH 6.0 to 10.0, or pH 7.0 to pH 9.75, or pH 8.0 to pH 9.5, or pH 8.5 to pH 9.5, or pH 9.0 to pH 9.5, or pH 8.75 to pH 9.25, or pH 8.9 to pH 9.1, or pH 8.95 to pH 9.05, or a higher, lower, or intermediate range, preferably in a pH in the range of pH 8.75 to pH 9.25. For initial evaluation purposes, screening at a pH of about 9.0 is recommended, with the further recommendation that lower and higher values be evaluated for the purpose of optimizing the results.

The method of the invention as it pertains to the anionic metal affinity ligand may be practiced in the range of pH 6.0 to pH 10, or pH 7.0 to pH 9.5, or pH 8 to pH 9.25, or pH 8.5 to pH 9.5, or pH 8.75 to pH 9.25, or a narrower, broader, or intermediate range.

In some embodiments, the entire method is run at essentially constant pH. In one such example the column and sample are equilibrated to about pH 9. The column is then loaded, washed, and eluted with a gradient of increasing salt, all at pH 9.0.

In some embodiments, the column and sample for practicing the method as it applies to the cationic metal affinity ligand may be initially equilibrated to a lower pH value, such as in the range of pH 6.0 to 7.0, the sample loaded onto the column and the column is washed to remove unbound contaminants, then the loaded column is re-equilibrated to a higher pH value in preparation for the elution step. This produces the unexpected benefit of increasing capacity, since AAV binds more strongly to cationic ligand-metal complexes at pH 6.0 than it does at pH 7.0, or at pH 8.0, or at pH 9.0. Increasing capacity with decreasing pH is hypothesized to result from increased hydrogen bonding, reflecting an underlying increase in protonation. Once the sample is bound, the column can be re-equilibrated to any conditions desired to maximize separation of empty capsids and full capsids. Low-pH sample binding has additional utility for removing DNA since t has been surprisingly found that solid-phase TREN-metal surfaces bind DNA more strongly at acidic pH than at neutral or alkaline pH.

In some embodiments, the cationic metal affinity column may be equilibrated at an alkaline pH such as pH 9 but the sample to be loaded may be at a lower pH value such as pH 7. The lower pH of the sample will cause a transient re-equilibration of the column to the lower pH during sample loading. Experimental data indicate that AAV binds more strongly to TREN at lower pH values such as pH 7, which is generally understood to increase binding capacity. Upon termination of the sample loading phase, restoration of equilibration buffer flow will overcome the transient effect of sample loading and re-equilibrate the column to pH 9. It will be recognized by persons of experience in the art that this results in a more streamlined workflow since it does not require buffer equilibration at pH 7 in advance of loading the sample.

In one embodiment, the cationic metal affinity solid phase loaded with a multivalent metal cation is equilibrated to a pH of 9.2 with a Tris-borate buffer, where the particular object of using a Tris-borate buffer is provide strong buffering capacity at low ionic strength. In one such embodiment, the buffer itself does not contain a multivalent metal cation. In one embodiment, a sample containing empty and full AAV capsids in roughly physiological conditions is applied, where the term roughly physiological is understood to mean a pH within the range of about pH 6.5 to pH 7.5 and a conductivity ranging from about 50 mS/cm to about 200 mS/cm. The sample may contain but need not contain an additional buffering agent. Application of the sample to the column will disequilibrate the column to the pH and conductivity conditions of the column, after which resumption of equilibration buffer flow will restore the column to its original equilibration conditions in preparation for initiating an elution gradient. In one such embodiment, the column is eluted with a linear gradient to a multivalent metal cation. In one such embodiment, the metal cation is magnesium. In one such embodiment, the metal cation gradient may be followed by a gradient or step to a non-metallic salt such as sodium chloride. In another embodiment, the metal cation gradient may be followed by a step to a cleaning agent such as NaOH. In some such embodiments, NaOH may be accompanied by other agents with the intention of enhancing its cleaning ability, such as sodium chloride. In some such embodiments the cleaning buffer may contain 1 M NaOH and 1-3 M NaCl.

It will be recognized by persons of knowledge in the art that stronger binding at lower pH values is directly contrary to expectations based on known protein behavior on anion exchangers. Protein retention on anion exchangers is understood to become weaker with decreasing pH. Stronger binding at lower pH values is also distinct from the behavior of known metal affinity chromatography media since low pH is often used to elute them. These findings highlight the point that although chromatographic solid phases bearing cationic ligand-metal complexes show influences tracing back to both IMAC and anion exchange, cationic ligand-metal complexes produce a net selectivity distinct from either.

In some embodiments where AAV is captured at a pH value below 9, the cationic metal affinity column may be eluted with an increasing pH gradient rather than with a salt gradient. In one such example, the metal-loaded column is equilibrated to a pH of about 6 in a buffer containing about 15 mM sodium chloride. Sample conditions should be about the same. After the column has been loaded with AAV capsids and washed to remove unbound sample components, the column is eluted with an increasing pH gradient to a buffer with a pH of about 9, containing about 100 mM sodium chloride, in other words eluting with an increasing pH gradient while holding salt concentration constant. Combined pH elution also occurs when salt concentration is increased in parallel with pH. It will be recognized that many variations of this approach are possible, including but not limited to increasing salt concentration while increasing pH and decreasing salt concentration while increasing pH, or eluting in a series of steps that vary pH and salt concentration independently. It will also be recognized that this feature further differentiates the method of the invention from anion exchange chromatography on strong anion exchangers, where increasing pH causes AAV to bind more strongly Buffering compounds and or combinations of buffering compounds that provide good buffering capacity in each of the above ranges are known in the art. Compounds with known ability to contribute buffer capacity in the region of pH 9 include glycine ($pK_a$ 9.6), arginine ($pK_a$ 9.1), bis-tris propane ($pK_a$ 9.0), and boric acid ($pK_a$ 9.15-9.25). Such buffers are commonly used throughout the art at concentrations of 20 mM to 50 mM, though the concentration can be reduced or increased to meet the needs of special requirements. As a general matter, cationic buffers are preferred for use in conjunction with chromatography using cationic surfaces, such as the chromatographic solid phases specified for the method of the invention. This favors the use of first 3 species from the above list. Boric acid is anionic; negatively charged. A possible limitation of using anionic buffers with cationic chromatography surfaces is that interactions between the buffer and the surface extract much of the buffer from the mobile phase, leaving the mobile phase with inadequate buffering capacity. However, it is also true that using buffers with a charge opposite to the chromatography surface can sometimes support unique selectivities that serve the interests of a given separation. Combinations of anionic and cationic buffering species is also possible, as well as the use of zwitterionic buffers and combinations of zwitterionic buffers with cationic and/or anionic buffers. Zwitterionic buffers with a pKa close to 9 include 3-([1,1-Dimethyl-2-hydroxyethyl]amino)-2-hydroxypropanesulfonic acid (AMPSO, $pK_a$ 9.36), and N-cyclohexyl-3-aminopropanesulfonic acid (CAPSO, $pK_a$ 9.43), among others.

In some embodiments, buffers may be selected particularly for their ability to provide good buffering capacity at low conductivity. In one such embodiment, boric acid is used as a buffer at a pH of about 9.0 to 9.2. In one such embodiment, Tris is used as a counterion to raise titrate the pH of the buffer to the selected targe pH because Tris also embodies low molar conductivity and its buffer capacity is nil at pH values in the range of pH 9.0 to 9.2.

In some embodiments where borate buffers are employed, persons with knowledge in the art of borate chemistry will recognize that borate anions are sometimes referred to as synthetic lectins for their ability to form covalent bonds with cis-diols such as found on some carbohydrates. The formation of such bonds endows the complex with a negative borate charge in place where there were previously two uncharged hydroxyl groups. Since the bond is covalent, it survives exposure to high salt concentrations. It will be understood that the electrostatic charge of AAV capsids possessing cis-diol carbohydrates will become more electronegative, with their net electronegativity enhanced according to the number of cis-diol borate binding events on the surface of any given capsid. It will be further understood that to the extent empty and full capsids are differentially endowed with cis-diols sugars, the formation of covalent bonds with borate anions will alter their relative electronegativity, which may alter their relative retention on a cationic chromatography support. To the extent that empty capsids are relatively enriched in cis-diols, the expectation will be that their retention will be increased.

In other embodiments where borate buffers are employed, persons with knowledge in the art of borate chemistry will recognize that borate anions are known in some contexts to alter the selectivity of metal binding by chelating agents and compounds that bear chelating sites. By extension, such modification should be understood to potentially include sites on protein surfaces with the ability to chelate metals, including AAV capsid proteins. To the extent that empty and full capsids differ with respect to their metal chelating sites, further modification of the metal binding selectivity of their respective metal binding sites by borate may affect the separation of empty and full capsids by chromatography.

In one embodiment, separation of empty and full capsids is performed on the cationic metal affinity solid phase by eluting the chromatographic solid phase with a gradient of increasing salt, where the salt is sodium chloride, or potassium chloride, or sodium acetate, or potassium acetate. As a general matter, sodium chloride is a suitable species to begin with and there will be no requirement for evaluating others. However, doing so may produce results of interest. AAV capsids from different serotypes are known to have different affinities for anion exchangers, so it will be understood that a broad gradient, such as ending at 1 M sodium chloride will be advisable as a starting point. The endpoint can be adjusted subsequently to maximize separation among empty and full capsids. In one example with AAV serotype 2/8, an initial 50 column volume (CV) linear gradient was run to an endpoint of 1 M NaCl. In a subsequent experiment, the gradient length was maintained but the endpoint was reduced to 500 mM NaCl, and in another subsequent experiment, it was reduced to 250 mM. Experimentation of this nature is a routine part of normal process development. As a general matter, the gradient endpoint with the lowest salt concentration that separates empty from full capsids and achieves good recovery of full capsids will be preferred since such conditions should also leave the largest proportion of DNA still bound to the solid phase.

In some embodiments, arginine, histidine, or lysine may be used as eluting agents in place of inorganic salts.

Salts with strong capacity to bind metal cations are not recommended because they will tend to remove the metals bound to the solid phase ligand. They will also tend to elute DNA prematurely and potentially prevent the method from achieving the level of DNA removal of which it should be capable. Salts of particular concern include citrates, phosphates, pyrophosphates, ethylenediaminetetraacetic acid (EDTA), ethylene glycol-bis(β-aminoethyl ether)-N,N,N', N'-tetraacetic acid also known as egtazic acid (EGTA), aspartic acid, glutamic acid, glutamine, and other known chelating salts.

The buffers used to perform the method of the invention may contain compounds to stabilize AAV capsids or suppress their non-specific interactions with the chromatography surface.

Such stabilizing compounds may include non-ionic or zwitterionic surfactants such as octaglucoside, poloxamer 188, Pluronic F68, CHAPS, or CHAPSO, among others. Such stabilizing compounds may instead or additionally include sugars such as sucrose, sorbitol, xylose, mannitol, or trehalose, among others. Such stabilizing compounds may instead or additionally include amino acids such as betaine, tauro-betaine, arginine, histidine, or lysine, among others. In the pH range of 4.0 to 7.5, they may also include glycine and alanine. All of these agents are known in biopharmaceutical field because they tend to improve solubility and/or recovery of stable product. In some cases, they also improve fractionation of a desired product from undesired species. They are typically used at low concentrations which are unlikely to interfere with practicing the method of the invention.

In one embodiment, it may be possible to elute AAV capsids from cationic ligand-metal solid phases by an increasing gradient of a non-ionic or zwitterionic strong hydrogen donor-acceptor such as a sugar or urea. This embodiment requires first that a column be loaded with AAV capsids, then the pH and salt concentration raised to the highest levels at which full capsids do not elute. From that point, full capsids may be eluted by application of a step or gradient to urea, or sugar, or another nonionic hydrogen-donor acceptor. In one such embodiment, the full capsids are eluted with a gradient to 300 mM sorbitol at the same pH and salt concentration. In another such embodiment, the full capsids are eluted with a gradient to 10 M urea at the same pH and salt concentration.

In some embodiments, the method of the invention may simultaneously exploit the influence of two different metal species. In on such embodiment, the cationic metal affinity substrate is charged with ferric iron while elution of AAV capsids is performed with by a gradient produced by increasing the concentration of magnesium. In closely related embodiments, the metal used to charge the cationic metal affinity substrate may be manganese. In other closely related embodiments, the metal used to perform elution of AAV capsids may be calcium or barium or copper.

Figure 2:
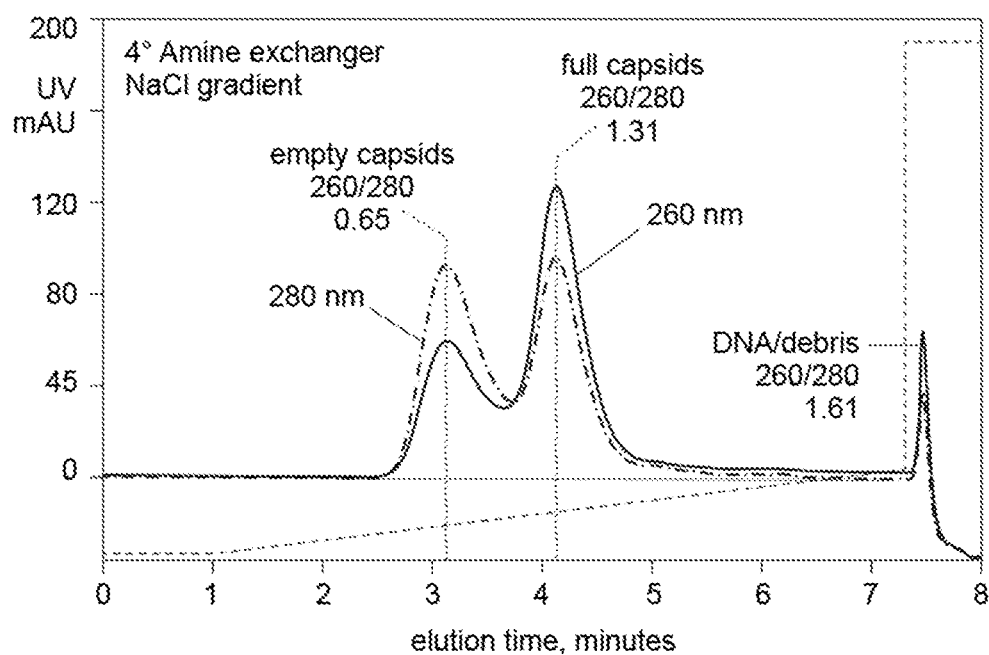
FIG. 2 depicts identification of empty and full AAV capsids by their respective ratios of UV absorbance at 260 nm and 280 nm. The notation 4° refers to a quaternary amine (QA) anion exchanger. The gradient was run with sodium chloride.

Analysis to demonstrate the effectiveness of the invention may be performed with known techniques. One common method is to measure the ratio UV absorbance at 260 nm and at 280 nm across the chromatography fractions. AAV capsids are partially transparent to UV light. This permits standard UV monitoring of chromatograms to detect DNA inside the capsids as well DNA associated with the external protein capsid walls. Empty capsids commonly exhibit a 260/280 ratio lower than 1, typically in the range of 0.6 to 0.8. Highly purified full capsids typically exhibit a 260/280 ratio greater than 1.3 (FIG. 2). The higher the ratio, the higher the proportion of full capsids in the corresponding chromatography fraction. For example, a ratio of 1.35 is understood to contain a larger proportion of full capsids than a fraction with a ratio of 1.33, which in turn is more enriched in full capsids than a fraction with a ratio of 1.31, etc. Secondary confirmation of full and empty capsids may include analytical ultracentrifugation (AUC) and cryo-transmission electron microscopy (cryoTEM). Wavelength ratios can also be used to indicate where contaminating DNA elutes in chromatograms, since DNA outside AAV capsids also has a distinctive 260/280 ratio, ranging from about 1.5 to 2.2, where the ratio of pure DNA is slightly above 2.0.

Figure 3:
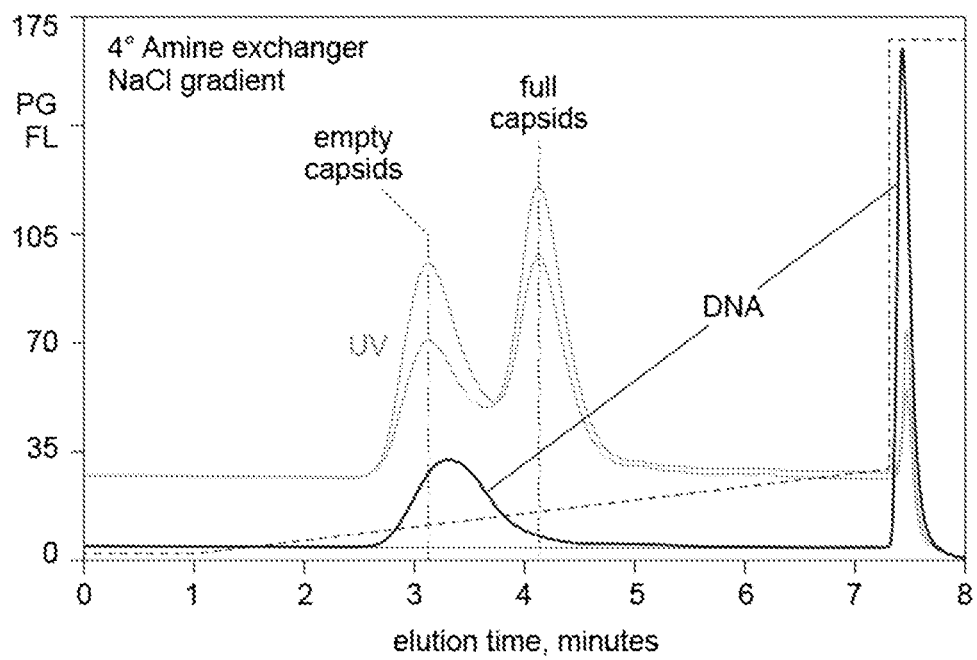
FIG. 3 depicts detection of DNA during separation of empty and full capsids with an in-line fluorescence monitor to detect DNA-intercalated Picogreen. UV chromatogram from FIG. 2 shown in light gray for reference. Note that the majority of DNA is associated with exteriors of empty capsids.

The amount of DNA associated with capsid exteriors may be estimated by pre-incubating the samples with a dye called Picogreen prior to chromatography. Picogreen is one of a class of dyes that can insert themselves between the base pairs of DNA. This process of insertion is known as intercalation. Picogreen by itself has no optical properties of significance but Picogreen between the base pairs of DNA generates green fluorescence that can be used to amplify detection of DNA (FIG. 3). Picogreen has been shown experimentally to detect only DNA outside the capsids. Thus estimation of DNA content by both UV and Picogreen can provide more insightful information than either method alone.

Ratios of Picogreen fluorescence to UV absorbance can also be plotted to indicate the relative amount of DNA outside the capsids to the capsids themselves, for example across a series of fractions obtained from practicing the method of the invention.

In some embodiments, the method of the invention may be practiced after first having treated the sample to reduce the amount of DNA contamination. In one such embodiment, the sample is treated in advance with a DNAase enzyme. In another such embodiment, the sample is treated in advance with a positively charged solid phase particles, with the intent of binding DNA and then removing the DNA by removing the particles to which the DNA is bound. In a related embodiment, the sample is treated with positively charged polymers, with the intent of forming large insoluble complexes with DNA that precipitate and can be removed by centrifugation, or by filtration, or by a combination of the two.

In one compound embodiment, a sample containing AAV capsids and DNA is treated first with an electropositive solid phase to facilitate processing by tangential flow filtrations (TFF), then the sample is concentrated and diafiltered by TFF into a buffer suitable for nuclease treatment. The sample is then treated with a nuclease enzyme to break down the DNA. The sample is then further concentrated and diafiltered while removing nucleotides and histone proteins through the membrane. In this last embodiment, the filtration media is preferably selected to have the largest pores that retain AAV so that the largest diversity of contaminants can be eliminated.

In another series of embodiments cationic metal affinity step may be followed by an additional method to reduce the content of empty capsids and DNA. In one such embodiment, the additional method may be a chromatographic method such as anion exchange chromatography on a strong anion exchanger. In another such embodiment, the additional method may be anion exchange chromatography on a primary amine exchanger where the empty and full capsids are separated in an ascending pH gradient. In another such embodiment, the additional method may be density gradient centrifugation.

In another series of embodiments, the sample is first treated to reduce the amount of DNA in advance of performing the method of the invention, and also followed by a method to further reduce the content of empty capsids and DNA.

In another series of embodiments, the method of the invention is used as a polishing method to reduce the empty capsid and DNA content of a sample that has already been processed to remove the majority of contaminants. In one such embodiment, a first purification step is performed using the known method of cation exchange chromatography. After retrieving the partially purified AAV from among the elution fractions of the cation exchange step, those AAV fractions are processed by the method of the invention. In another such embodiment, a first purification step is performed using the known method of bioaffinity chromatography. After retrieving the partially purified AAV from among the elution fractions of the bioaffinity step, those AAV fractions are processed by the method of the invention. In either of these embodiments, the sample may be treated in advance as describe above to reduce DNA content in advance of the first chromatography step.

In one embodiment, the method of the invention may be performed in a configuration where the TREN-metal solid phase is plumbed in series with a quaternary amine anion exchange solid phase. In one such embodiment, the quaternary amine solid phase may be placed first in the sequence. Both solid phases are equilibrated together by the same equilibration buffer, for example at pH 9. The sample is loaded, the column is washed, and then eluted with a salt gradient. Since AAV elutes from strong anion exchangers at a lower concentration of salt than from cationic ligand-metal solid phases, the AAV capsids will elute from the strong anion exchanger and re-bind on the cationic ligand-metal solid phase. A large subset of DNA, however, will remain bound to the strong anion exchanger, including throughout elution of the capsids from the cationic ligand-metal solid phase. By preventing this subpopulation of DNA from being resident on the cationic ligand-metal solid phase, the full capacity of the cationic ligand-metal solid phase will be available for capsid separation. Both columns can be washed with high salt and NaOH in tandem to release strongly bound contaminants. In an alternative embodiment, the sequence of the solid phases is reversed.

In a related embodiment, the method of the invention is combined with a step employing a primary amine anion exchanger. In one such embodiment, the primary amino solid phase may be run first in the sequence. The primary amine anion exchanger is loaded at a pH value in the range of pH 7 to pH 8, and is subsequently eluted with a pH gradient to a pH of about 10. This provides a partial separation of empty and full capsids and a partial reduction of contaminating DNA. The eluted full capsids may then be titrated to a pH of 9 or less and processed by the method of the invention to achieve further elimination of empty capsids and contaminating DNA. In some embodiments, the process order may be reversed.

In another closely related embodiment, the method of the invention is practiced in a configuration where the cationic metal-ligand solid phase is plumbed in tandem with an anionic solid phase where the anionic metal-ligand solid phase is first in the sequence. In one such embodiment, the anionic metal-ligand solid phase is iminodiacetic acid (IDA). In another such embodiment, the anionic metal-ligand solid phase is nitrilotriacetic acid. In one such embodiment, the anionic solid phase is charged with the same metal species as the cationic metal-ligand solid phase. In one such embodiment, the anionic solid phase is charged with a different metal species than the cationic metal-ligand solid phase. In one such embodiment, the anionic metal-ligand solid phase is charged with iron or manganese, while the cationic metal-ligand solid phase is charged with calcium, magnesium, or another non-iron, non-manganese species. In all of these embodiments, the anionic metal-ligand solid phase serves the purpose of removing phosphorylated contaminants from the sample before it contacts the cationic metal-ligand solid phase. In all such embodiments, the such heavily phosphorylated contaminants particularly include DNA, RNA, endotoxins, and cell membrane debris including membranes from organelles and vesicles. In all such embodiments, pre-emptive removal of these contaminants conserves the capacity of the cationic metal-ligand solid phase for AAV capsids and permits it to achieve higher purity of full capsids than when those contaminants are bound to the column along with the desired contaminants. In one embodiment, the tandem method is used to produce purified full AAV capsids in a single step.

In another such embodiment the anionic metal-ligand solid phase is not plumbed in sequence with the cationic metal-ligand solid phase. In one such embodiment, the sample is treated with the anionic metal ligand solid phase in advance of the performing the cationic metal-ligand solid phase method. In one such method, the two steps are performed sequentially. In one such embodiment, a cell culture harvest or lysate containing empty AAV capsids, full AAV capsids, and DNA is treated with an anionic metal-ligand solid phase in advance of performing the method of the cationic metal-ligand solid phase step. In a closely related embodiment, one or more additional steps are performed after the anionic metal-ligand step and before the cationic metal-ligand step. In one such embodiment, a cell culture harvest or lysate containing full capsids, empty capsids, and DNA is treated with an anionic metal-ligand solid phase the DNA-deficient solution is fractionated by the technique of affinity chromatography before continuing to separate empty and full capsids by performing the method of the cationic metal-ligand solid phase. In another such embodiment, the anionic metal-ligand solid phase-treated cell culture harvest or lysate is fractionated by the method of cation exchange chromatography before continuing to separate empty and full capsids by performing the method of the cationic metal-ligand solid phase.

In one embodiment, the DNA reduction step with the metal-loaded anionic metal affinity substrate is combined with coincident DNA reduction by means of a DNAse enzyme. In one such embodiment, the DNAase enzyme is a salt tolerant DNAse and the metal-loaded anionic metal affinity substrate is in the form of a soluble-polymer backbone bearing multiple metal-loaded anionic metal affinity ligands. In another such embodiment, the metal-loaded anionic metal affinity substrate is in the form of a solid insoluble particle bearing multiple metal-loaded anionic metal affinity ligands. In both such cases, the substrate bearing the multiple metal-loaded anionic metal affinity ligands is present during enzymatic lysis of DNA. In some such cases, the metal species with which the anionic metal affinity ligand is loaded is the same as the metal species co-factor required by the enzyme. In one such case, the metal ion is magnesium, in other such cases, the metal species with which the anionic metal affinity ligand is loaded is different from the metal species co-factor required by the enzyme. In one such case, the soluble enzyme co-factor is magnesium but the anionic metal affinity ligand is pre-loaded with iron. In another such case, the soluble enzyme co-factor is magnesium, but the anionic metal affinity ligand is pre-loaded with manganese.

In one embodiment, a solid phase bearing the cationic metal affinity ligand may be in the form or one or more porous particles, or one of more porous membranes, or one or more nanofibers, or a monolith, or a hydrogel, a depth filter, or another form of solid phase. In a closely related embodiment, a solid phase bearing the anionic metal affinity ligand may be in the form or one or more porous particles, or one of more porous membranes, or one or more nanofibers, or a monolith, or a hydrogel, a depth filter, or another form of solid phase.

In one embodiment, a solid phase for practicing any aspect of the method of the invention may be arranged as a flow-through device to facilitate the practice of chromatography methods. Flow-through devices for performing chromatography are commonly referred to as columns, regardless of their form or the material they contain, In one embodiment, the materials and methods of the invention, any previous processing steps, and any follow-on processing steps may be plumbed and interfaced with a microprocessor to enable automation of the multi-step process from end-to-end and, if desired, to perform the process on a continuous basis.

It will be recognized by persons of knowledge in the art that although AAV capsids of different serotypes share many basic physical and chemical similarities, they also exhibit significant variability with respect to their surface chemistry and purification characteristics. Affinity chromatography media tend to recognize one or a few serotypes. Some broad-spectrum affinity ligands recognize many AAV serotypes but this does not mean that they bind with the same affinity, give the same capacity, or elute under the same conditions. Diversity is also observed with respect ion exchange chromatography behavior. Different AAV serotypes bind cation exchangers with different avidity and elute under different conditions. Different AAV serotypes also bind anion exchangers with different avidity, and elute under different conditions, and with empty and full capsids separated to different degrees. Best-ranges are known for all such methods so that undue experimentation is not required to optimize any given method for any given serotype. It is expected that variability will likewise be observed with the method of the invention among serotypes with respect to their binding, capacity, elution, and empty-full capsid separation characteristics. Given foreknowledge of appropriate starting conditions, identification of key process variables, the ranges over which they may be evaluated, and the kind of effects they produce, as provided in this specification, undue experimentation is not required to optimize the method to best accommodate any given AAV serotype.

In one embodiment, the AAV serotype processed by the method of the invention may be AAV1, or AAV2, or AAV3, or AAV4, or AAV5, or AAV6, or AAV7, or AAV8, or AAV9, or AAV10, or AAV11, or another serotype. In another embodiment, the AAV serotype processed by the method of the invention may be a recombinant hybrid serotype like AAV2/8, or AAV2/9, or another hybrid serotype. In another embodiment, the AAV serotype processed by the method of the invention may be a synthetic recombinant serotype.

It will be recognized by persons of knowledge in the art that each serotype exhibits different retention characteristics on adsorption chromatography media of any kind. A consequence of this diversity with all chromatography methods is that the conditions need to be optimized to achieve the best overall purification of any particular serotype.

In one embodiment, the sample containing the empty capsids, full capsids, and DNA is a cell culture harvest. In a closely related embodiment, the sample containing the empty capsids, full capsids, and DNA is a cell lysate. In another closely related embodiment, the sample containing the empty capsids, full capsids, and DNA is a partially processed or partially purified preparation. In one such embodiment, the sample containing the empty capsids, full capsids, and DNA is a cell culture harvest or lysate that has been treated with an enzyme to lyse DNA. In another such embodiment, the sample containing the empty capsids, full capsids, and DNA is a cell culture harvest that has been treated with a cationic polymer or cationic solid phase to extract DNA. In another embodiment, the sample containing the empty capsids, full capsids, and DNA is a cell culture harvest or lysate that has been treated with a cationic solid phase, then concentrated and diafiltered by tangential flow filtration, then treated with an enzyme to lyse DNA. In an extension of that embodiment, the sample is then concentrated and diafiltered by tangential flow filtration in preparation for chromatographic purification. In another embodiment, a cell harvest or lysate is treated to precipitate contaminants, leaving the AAV in the supernatant. In another embodiment, a cell harvest or lysate is treated to precipitate AAV, leaving contaminants in the supernatant. The precipitate is resuspended is separated from the supernatant and resuspended, now free from the originally-unprecipitated contaminants. In another embodiment, a cell harvest or lysate is partially purified by a chromatographic method. In one such embodiment, the harvest or lysate is partially purified by affinity chromatography. In another such embodiment, the harvest or lysate is partially purified by hydrophobic interaction chromatography. In another such embodiment, the harvest or lysate is partially purified by size exclusion chromatography. In another such embodiment, the harvest or lysate is partially purified by cation exchange chromatography. In another such embodiment, the harvest of lysate is partially purified by anion exchange chromatography. The invention is further explained by the following non-limiting examples.

EXAMPLES

Example 1. Preparation of a reference baseline. A mixed sample of empty and full AAV8 capsids partially purified by cation exchange chromatography was injected onto a strong (quaternary (4°) amine) monolithic chromatography column equilibrated with 50 mM Tris, pH 9. The anion exchanger was eluted with a sodium chloride gradient to 200 mM, then the column was cleaned with a step to 500 mM sodium chloride. The elution profile is illustrated in FIG. 2. It shows partial separation of empty and full capsids with a single empty-capsid peak eluting before but overlapping with a single full-capsid peak. The full capsid peak shows a 260/280 wavelength ratio of 1.307. This is understood to mean that a proportion of empty capsids also elute in the region of the full capsids and depress the wavelength ratio. Note the relatively large size of the empty capsid peak.

Figure 4:
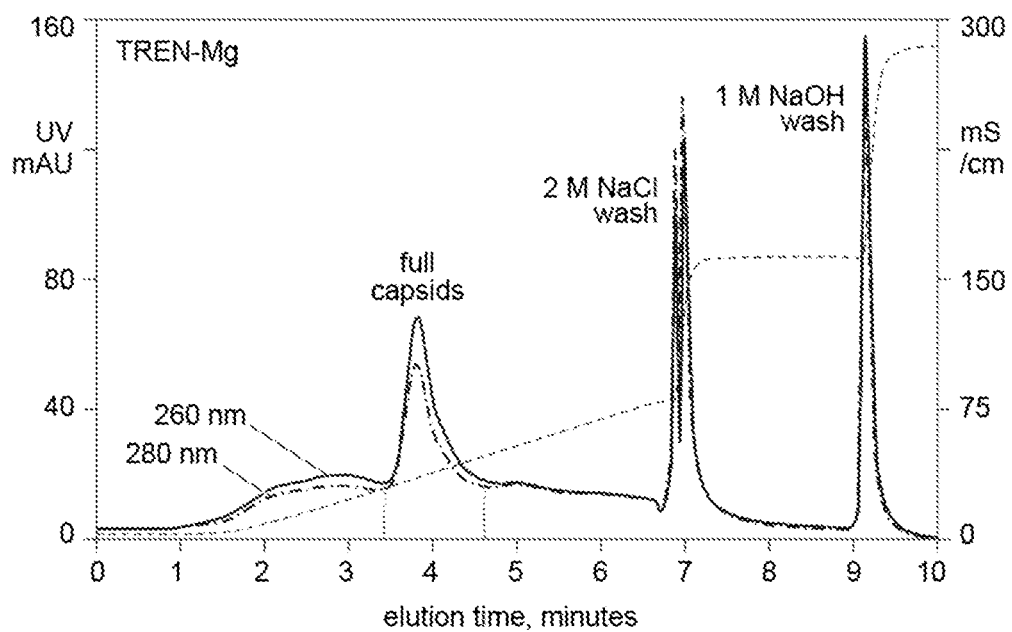
FIG. 4 depicts separation of empty and full AAV capsids on immobilized TREN-magnesium at pH 7.0.
Figure 5:
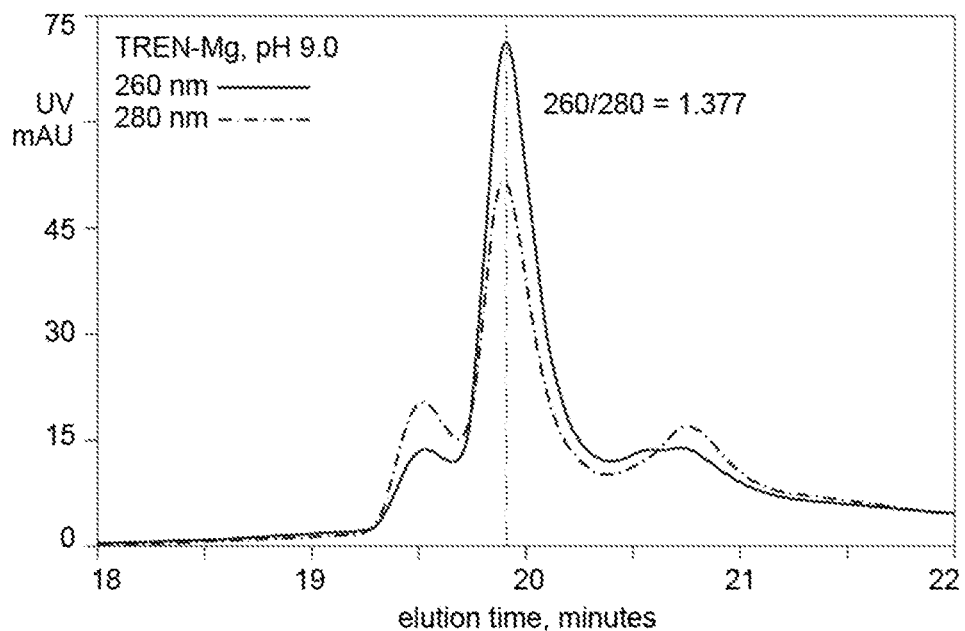
FIG. 5 depicts separation of empty and full capsids on immobilized TREN-magnesium at pH 9.0.

Example 2. Preliminary evaluation of empty and full capsid separation by TREN-Mg at pH 7.0 and at pH 9.0. A monolith with a TREN surface was loaded with divalent magnesium ions by exposing it to 100 mM magnesium acetate in water. The excess magnesium was rinsed away during equilibration of the column to pH 7.0 with 50 mM HEPES. The column was eluted with a linear gradient to 1 M sodium chloride. It was then cleaned with a step to 2 M sodium chloride, 50 mM HEPES, then cleaned further with a step to 1 M sodium hydroxide. The full capsid peak shows a 260/280 wavelength ratio of 1.240 (FIG. 4). In a separate experiment, a monolith with a TREN surface was loaded with divalent magnesium ions by exposing it to 100 mM magnesium acetate in water. The excess magnesium was rinsed away during equilibration of the column to pH 9.0 with 50 mM bis-tri-propane, 2 mM magnesium chloride. The same sample of empty and full AAV8 capsids partially purified by cation exchange chromatography used for Example 1 was injected onto the TREN-Mg column. The column was eluted with a linear gradient to 500 mM sodium chloride, 2 mM magnesium chloride. It was then cleaned with a step to 2 M sodium chloride, 50 mM bis-tris-propane, 2 mM magnesium chloride, then cleaned further with a step to 1 M sodium hydroxide. The elution profile is illustrated in FIG. 4. It shows partial separation of empty and full capsids with a two empty-capsid peaks, one eluting before the full-capsid peak and one eluting later. The full capsid peak shows a 260/280 wavelength ratio of 1.377 (FIG. 5). This is understood to mean that a proportion of empty capsids eluting in the region of the full capsids is smaller than when the sample was fractionated by the strong anion exchanger shown in Example 1. Overall results indicate that even though a degree of separation between empty and full capsids is obtained a pH 7.0, the separation is improved substantially at pH 9.0. Subsequent experiments at pH 9.25 indicated essentially equivalent performance but slightly inferior results at pH 9.5.

Figure 6:
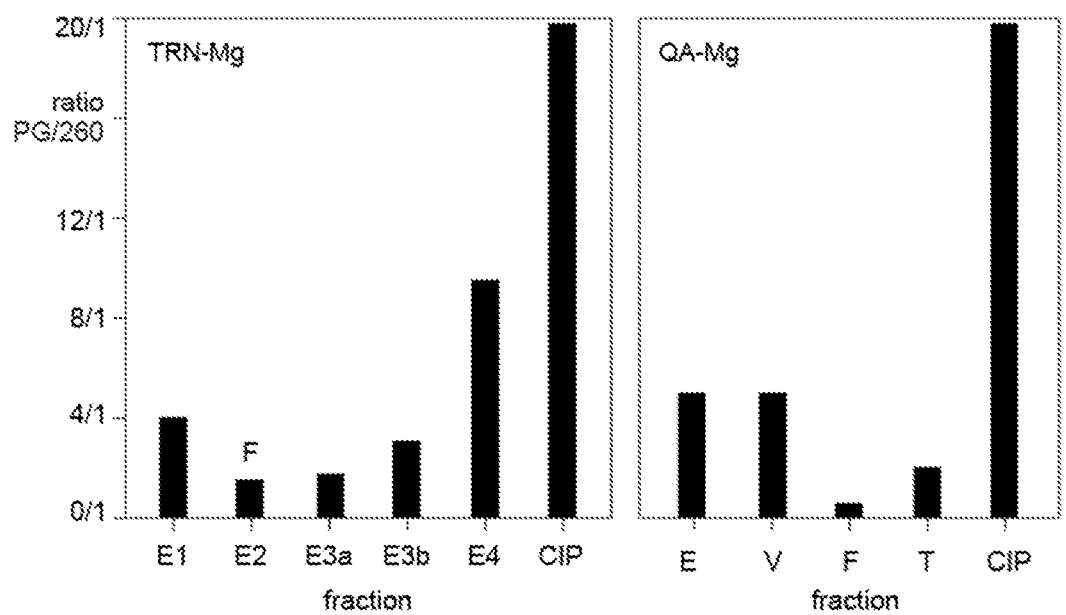
FIG. 6 depicts comparison of contaminating DNA distribution when empty and full capsids are separated by the method of the invention, compared with the contaminating DNA distribution when empty and full capsids are separated by a salt gradient on a strong anion exchanger. Data from the experiments that produced FIG. 4 and FIG. 2 respectively. The full capsid fraction is indicated by "F" in both cases. All other fractions represent empty capsids or debris.

FIG. 6 shows that the distribution of DNA on the capsid exteriors differs between the two methods. The heights of the bars were estimated by comparing the peak areas of the Picogreen fluorescence by UV absorbance at 260 nm from the chromatograms shown in FIG. 2 and FIG. 4. Fractions labeled with an F indicate the full-capsid fractions. The two methods show clear distinctions in the distribution of DNA, adding to the evidence that their selectivities are distinct from each other. This also highlights their complementarity and the potential value of following the method of the invention with anion exchange chromatography or vice versa.

Figure 7:
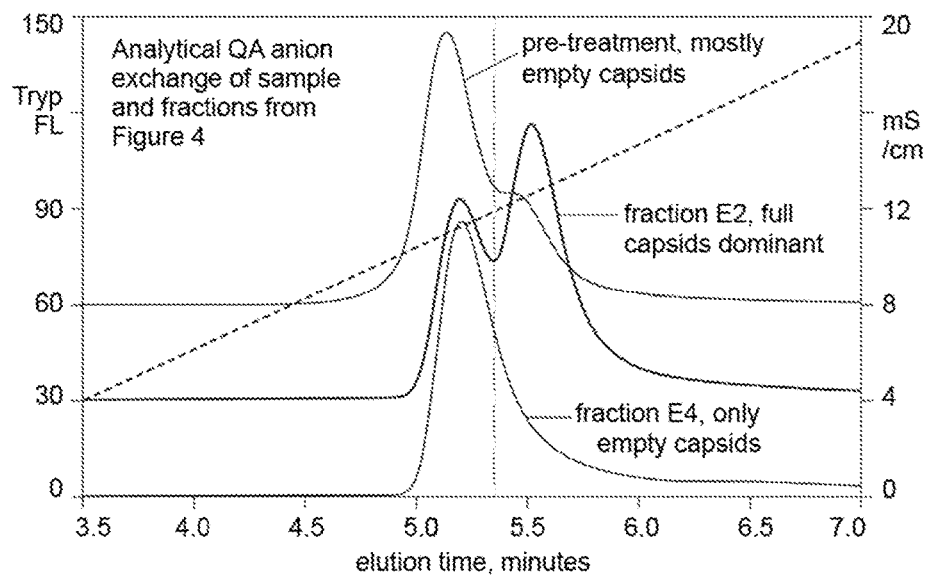
FIG. 7 depicts analysis of TREN-Mg fractions from Example 2 by anion exchange chromatography on a strong anion exchanger eluted with a sodium chloride gradient.

FIG. 7 compares analytical anion exchange profiles (quaternary amine) of the original cation exchange-purified sample, with the fraction from FIG. 6 containing the full capsids, and with the fraction from FIG. 6 containing the contents of the 2 M sodium chloride wash. The elution profiles were monitored for intrinsic tryptophan fluorescence for two reasons, the first being that tryptophan fluorescence increases the sensitivity of protein detection by a factor of 15-20. The second reason is that tryptophan fluorescence is produced only by proteins. It does not detect DNA. This avoids confusion due to uncertain individual contributions of proteins and DNA to UV absorbance at 260 nm and 280 nm. As shown, the original sample was heavily dominated by empty capsids. The full-capsid fraction was clearly dominated by full capsids. The sodium chloride wash fraction was populated exclusively by empty capsids. These findings demonstrate that the selectivity of the method of the invention is distinct from any known method and particularly distinct from the method of anion exchange chromatography with strong anion exchangers.

Figure 8:
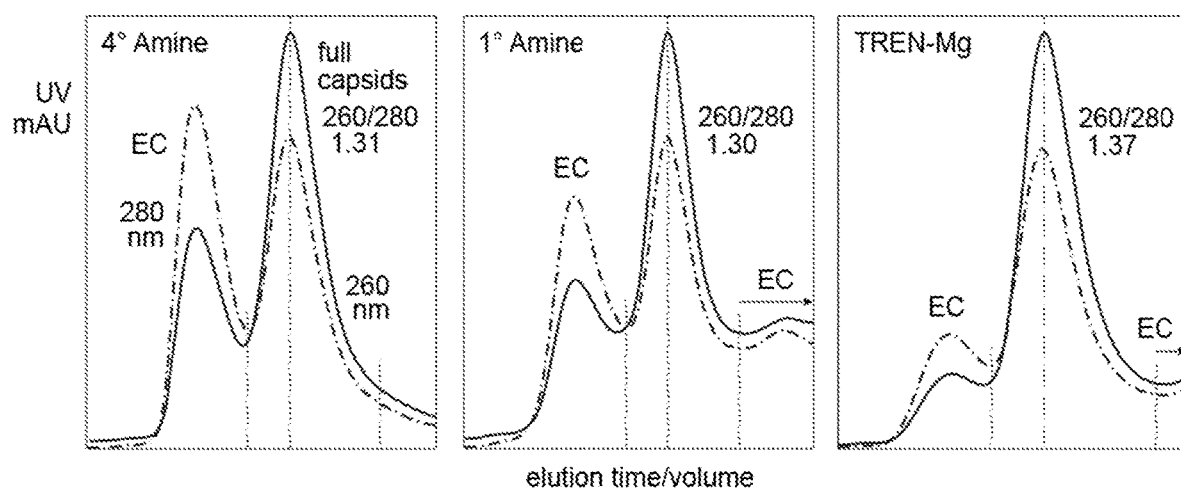
FIG. 8 depicts compared results from separation of empty and full capsids by different chromatography media using different elution methods. 4° Amine refers to a quaternary amine anion exchanger eluted with salt. 1° Amine refers to a primary amine anion exchanger eluted with an ascending pH gradient. TREN-Mg refers to the method of the invention as described in Example 2.

Example 3. Comparison with separation of empty and full capsids on a primary amino anion exchanger with an ascending pH gradient. A primary amine anion exchanger was equilibrated with 10 mM Tris, 10 mM bis-tris-propane, 2 mM magnesium chloride, pH 7.0. It was loaded with the same sample used to prepare Examples 1 and 2. FIG. 8 illustrates the elution region containing the full peak in the center panel at far right labeled 1° amine. It is compared with the corresponding region of FIG. 2 showing separation of empty and full capsids on a strong anion exchanger (left panel). It is also compared with the corresponding region of FIG. 5 showing separation of empty and full capsids by the method of the invention. As shown, the wavelength of the full capsid fraction from the primary amine anion exchanger was 1.30 versus 1.307 for the quaternary exchanger, versus 1.377 for the method of the invention. Overall, FIG. 8 highlights that the selectivity of the method of the invention is distinct from both types of anion exchangers and points to the effect of the immobilized metal ions.

Figure 9:
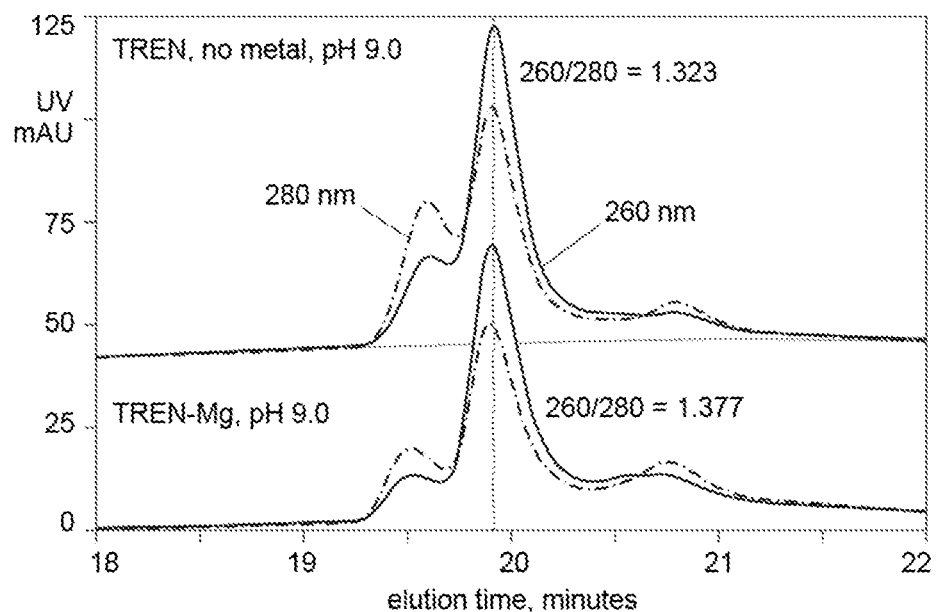
FIG. 9 depicts comparison of empty-full capsid separation by TREN without metal and TREN charged with magnesium.

Example 4. Comparison of capsid separation with and without metal supplementation of the chromatography buffers. FIG. 9 compares chromatography profiles a control run was performed lacking in metal ions (top profile). The TREN column was not charged with multivalent metal caions and the gradient buffers contained no multivalent metal cations. The profile at bottom illustrates results when 2 mM magnesium was used in the gradient buffers. It illustrates a significant shift of empty capsids to late eluting fractions and a substantial improvement in the proportion of full capsids in the main elution peak. This is indicated by its higher 260/280 ratio. In another experiment, the TREN column was equilibrated with magnesium before applying sample. Results (not shown) were identical to the results obtained when magnesium was supplied only in the gradient buffers. Beyond affirming the improved performance obtained by the presence of magnesium, these results show that the cationic metal affinity ligand need not be loaded with metal in advance of sample application, which represents the classical approach in the field of IMAC. Metals can be loaded onto the ligand at any point prior to the elution of the capsids.

Figure 10:
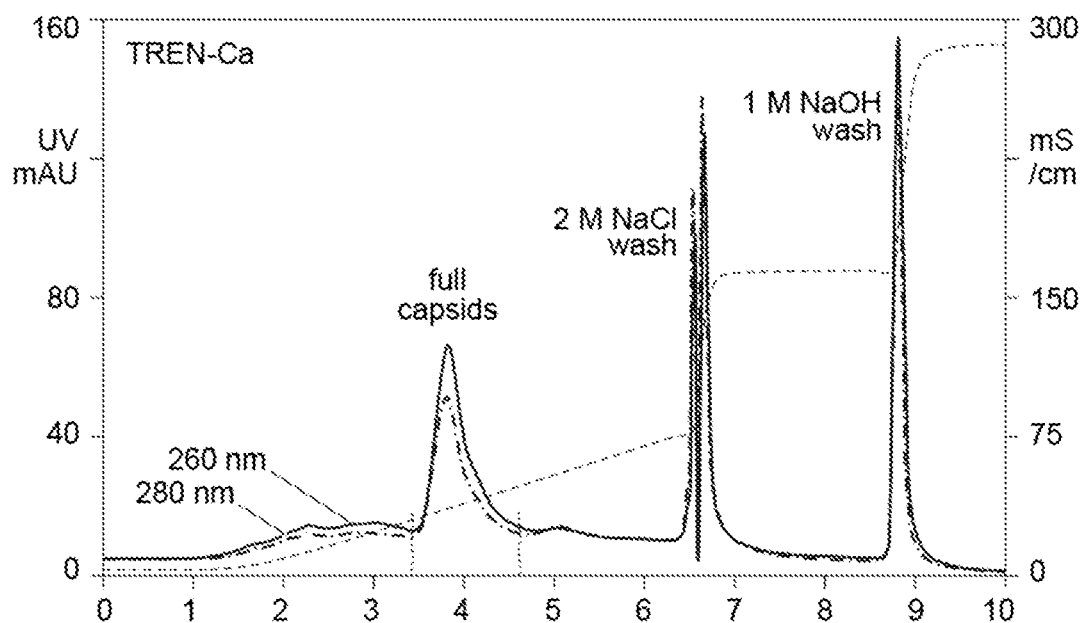
FIG. 10 depicts separation of full capsids from empty capsids and DNA by TREN-metal chromatography using calcium at pH 7.0. All conditions identical to Example 2 except switching calcium acetate for magnesium acetate.
Figure 11:
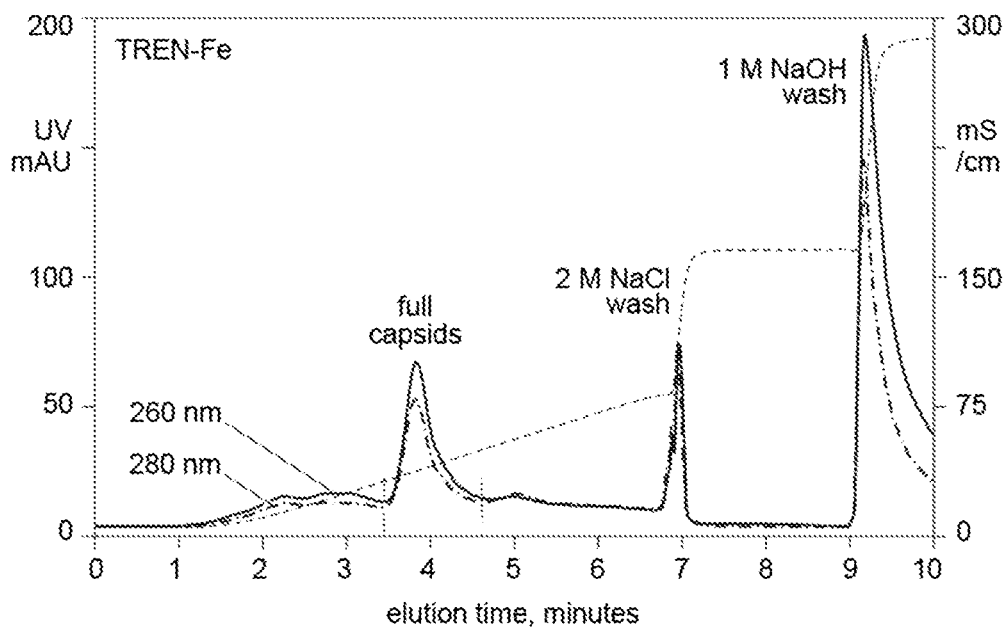
FIG. 11 depicts separation of full capsids from empty capsids and DNA by TREN-metal chromatography using ferric iron at pH 7.0. All conditions identical to Example 2 except switching ferric chloride for magnesium acetate.
Figure 12:
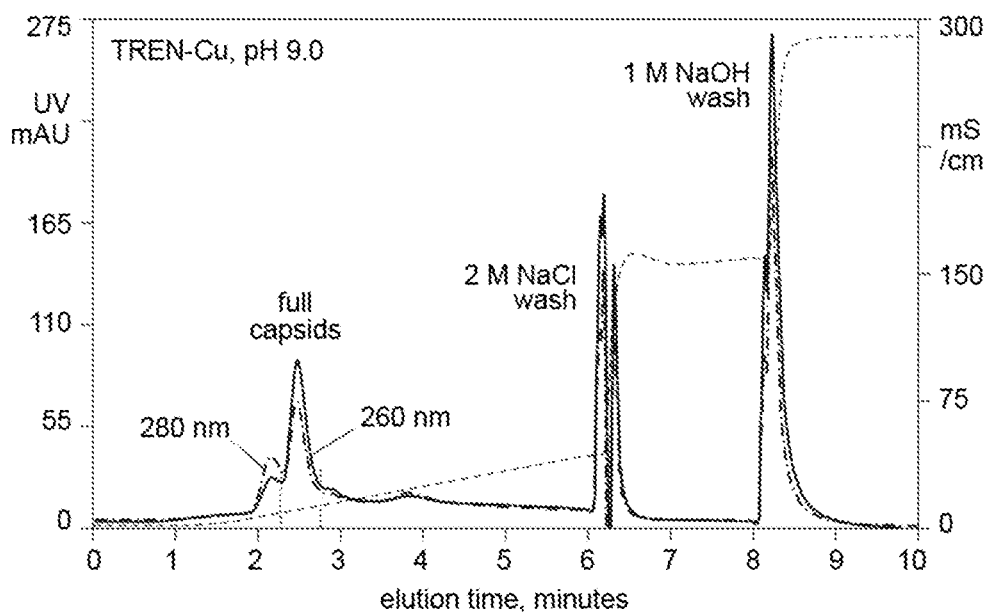
FIG. 12 depicts fractionation of cation-exchange purified capsids on TREN-copper at pH 9.0.
Figure 13:
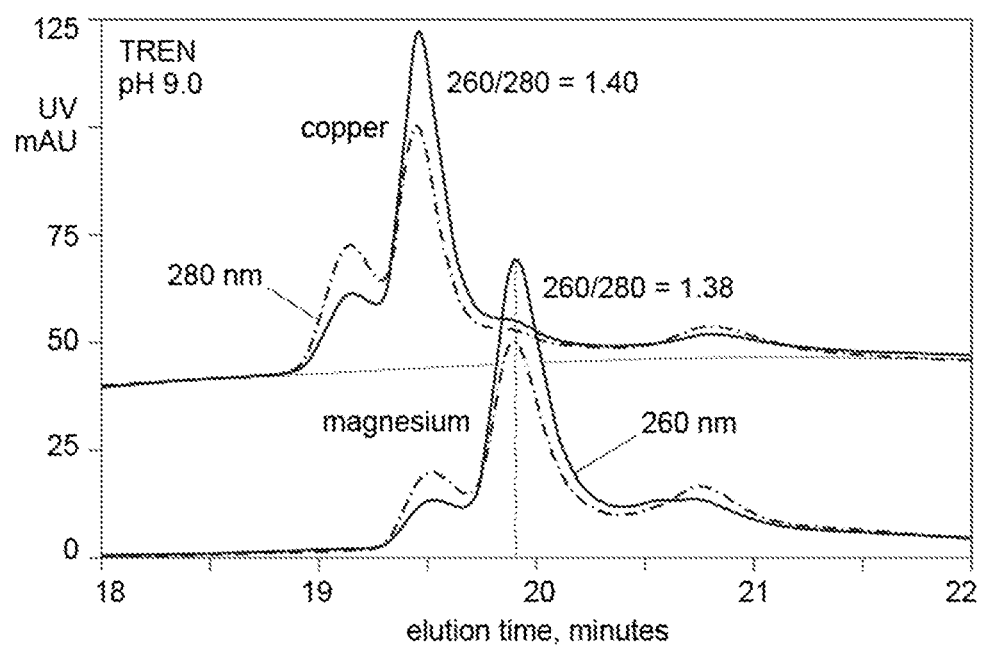
FIG. 13 depicts comparison of elution profiles from TREN-Cu at pH 9.0 with TREN-Mg at pH 9.0.

Example 5. Comparison of chromatography with different metal ions. The method as run in Example 2 was repeated except charging the TREN solid phase with a different metal in each case. Comparisons were made with calcium, iron (ferric), manganese, copper (cupric), zinc, and barium. The profiles were remarkably consistent in the region where empty and full capsids eluted but varied in the regions of the washing steps. Iron and manganese in particular showed dramatically larger peaks in the sodium hydroxide clean-in-place peaks. FIG. 10 illustrates the chromatogram for calcium. FIG. 11 shows the chromatogram for iron. These differences were attributed to disproportionately stronger binding of DNA to iron. FIG. 12 illustrates the chromatogram for copper (cupric) at pH 9.0. Copper showed a larger cleaning peak than calcium or magnesium but smaller than iron. The use of manganese (not shown) gave a cleaning peak intermediate between iron and copper. FIG. 13 compares the elution profiles in the region of capsid removal for magnesium and copper. Note the offset between the elution profiles with capsids eluting earlier in copper. Copper also produced the most favorable wavelength ratio among the comparisons, indicating that it produced the full capsid fraction with the lowest proportion of empty particles. The full capsid peak was also narrowest with copper and variant subpopulations among the empty fractions were more clearly resolved.

Figure 14:
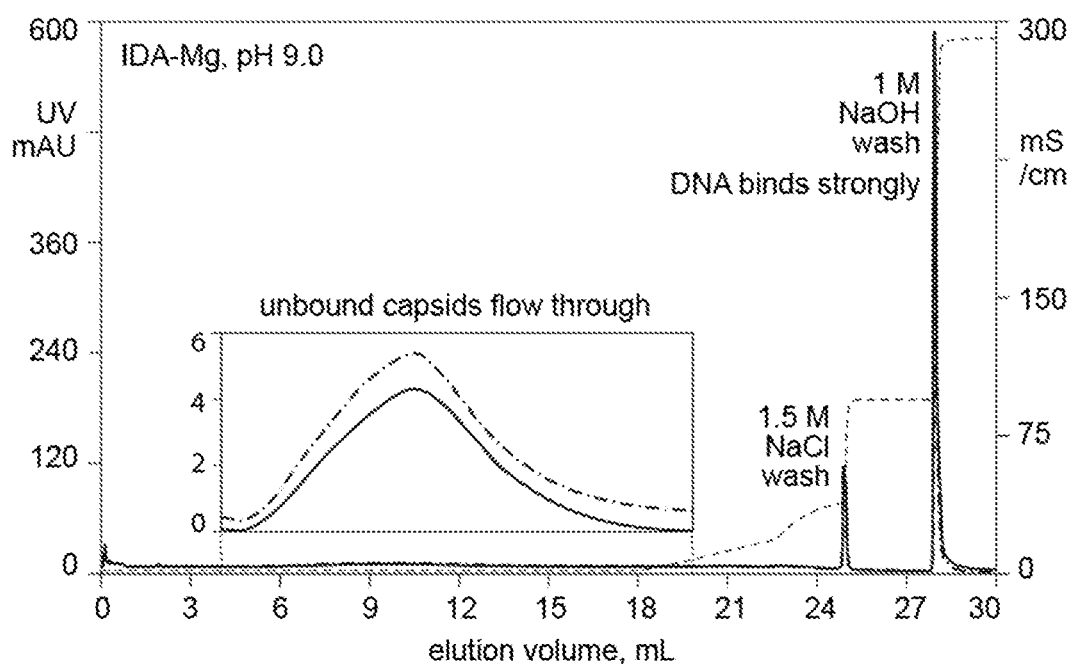
FIG. 14 depicts application of cation exchange-purified AAV capsids to a magnesium-charged anionic metal affinity-ligand (IDA) at pH 9.

Example 6. Evaluation of an anionic metal affinity ligand loaded with magnesium for pre-emptive reduction of DNA. A monolith bearing iminodiacetic acid (IDA) chelating residues was loaded with magnesium and equilibrated to pH 9.0. A sample of cation exchange-purified capsids was equilibrated to the same conditions and loaded onto the column. AAV capsids passed through the column unbound and unfractionated, highlighting the importance of the cationic metal affinity column for capture and separation of empty and full capsids. However, DNA and contaminants from the sample were bound (FIG. 14).

Figure 15:
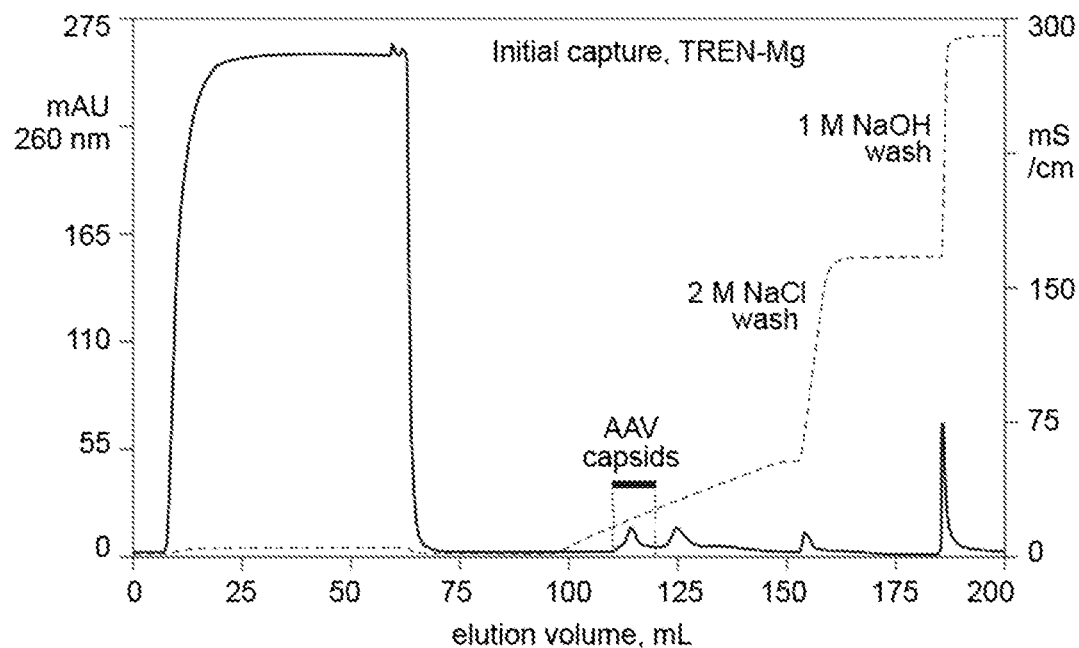
FIG. 15 Depicts initial capture of prepared sample on TREN-Mg. Complete chromatogram.
Figure 16:
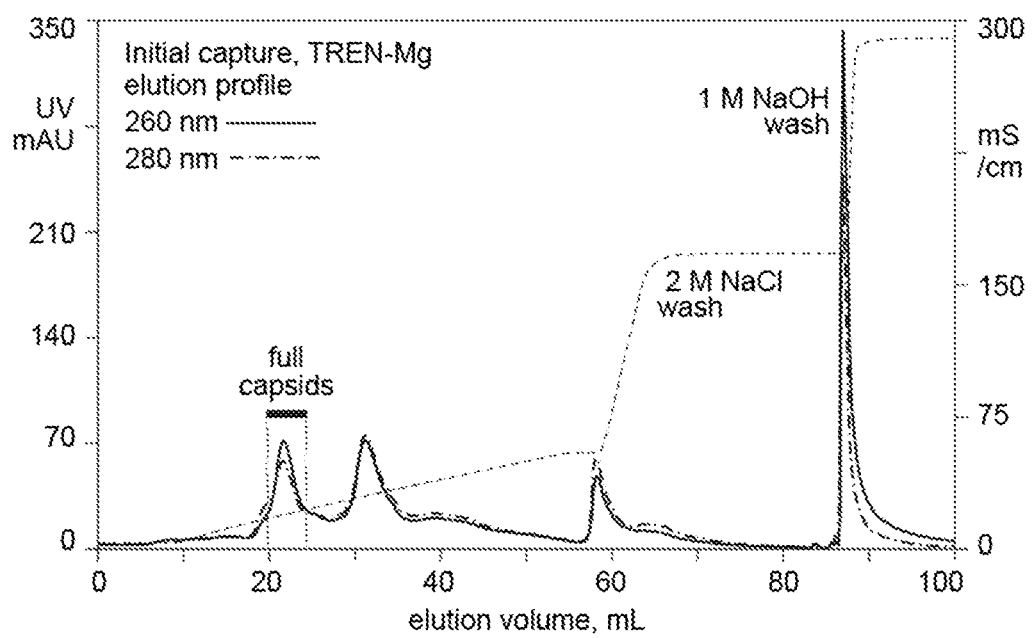
FIG. 16 depicts initial capture of prepared sample on TREN-Mg. The region of capsid elution and cleaning steps from FIG. 15.
Figure 17:
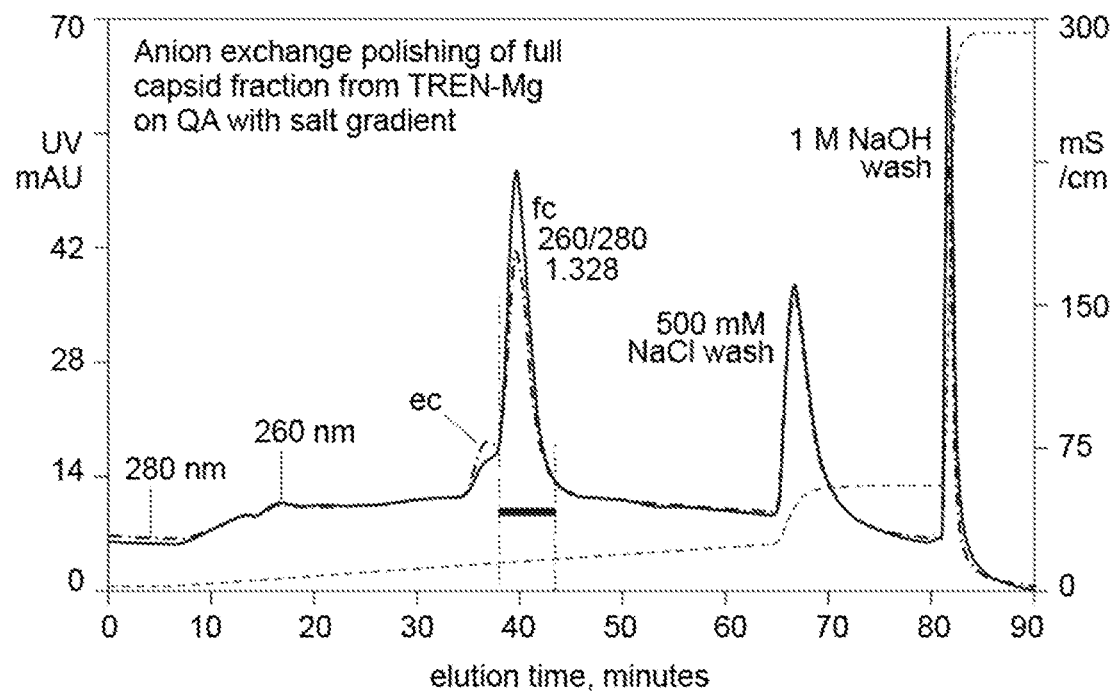
FIG. 17 depicts anion exchange polishing of the AAV full capsid fraction from FIG. 16.
Figure 18:
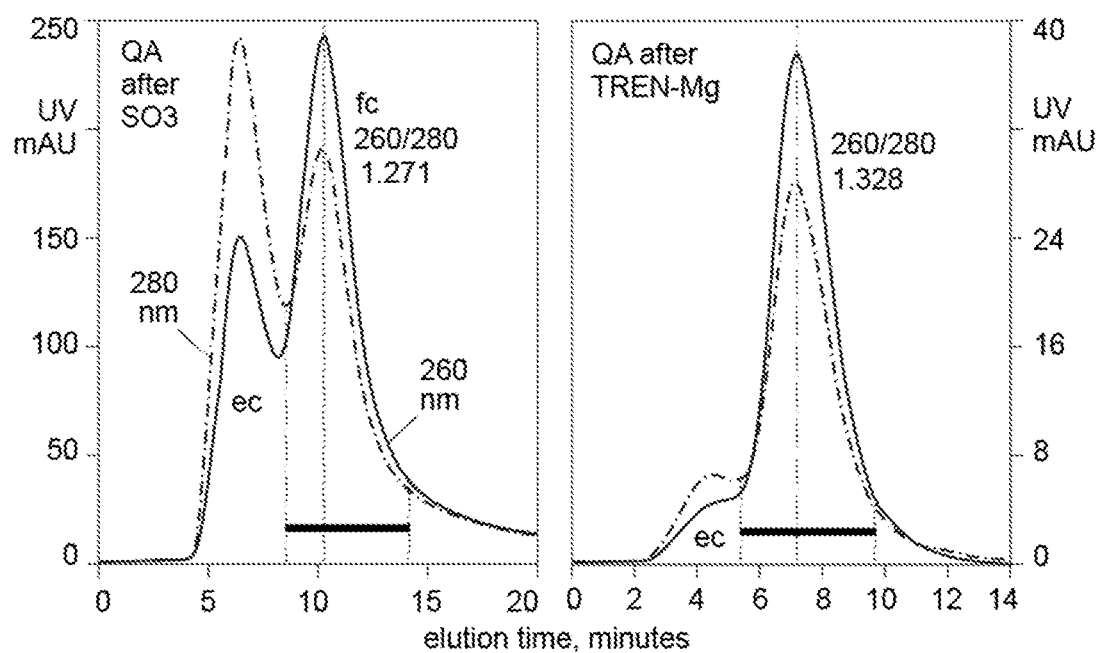
FIG. 18 depicts comparison of anion exchange polishing profiles after capture by two different capture columns. In both cases, sample prepared as described in Example 6. Left-hand profile: the anion exchange polishing profile after capture by the known method of cation exchange chromatography. Right-hand profile: the anion exchange polishing profile after capture by the method of the invention, zoomed image from FIG. 17.
Figure 19:
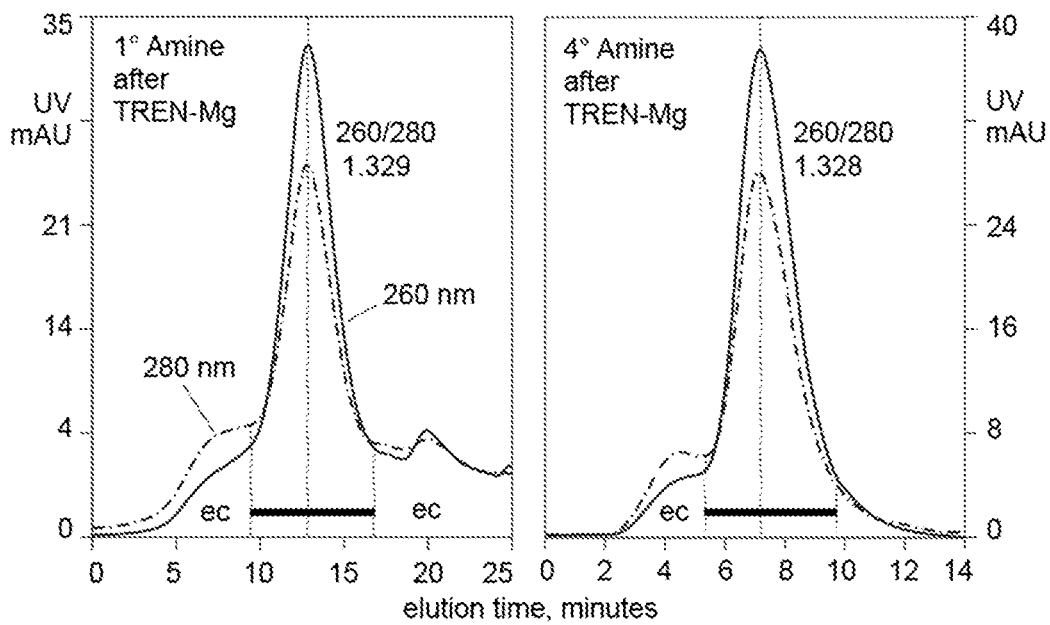
FIG. 19 depicts comparison of empty capsid reduction after TREN-Mg capture (FIGS. 15,16) by a primary amine anion exchanger eluted with a pH gradient (left panel) versus a quaternary amine anion exchanger eluted with a salt gradient (right panel).

Example 7. Integration of the method of the invention in a multi-step purification method. Filtered cell culture lysate containing DNA, empty and full AAV capsids was treated with particles bearing ethylene diamine on their surfaces endowing them with a positive charged. They were mixed with particles bearing negatively charge SO3 groups. The mixed particles were added to the sample at a volumetric ratio of 5% and incubated mixing for 60 minutes. The particles bound a large proportion of soluble host cell DNA. The particle-DNA complexes were sedimented and the supernatant filtered through a membrane filter with a 0.45 μm pore size cutoff. This treatment improved filterability to a degree that it enabled sample concentration by tangential flow filtration. The sample was concentrated 10-fold using a membrane with a pore size cutoff of 300 kDa, which enabled elimination of many small-molecule contaminants, including proteins. The sample was also diafiltered by tangential flow filtration into a buffer suitable for performing enzymatic lysis of DNA with a salt tolerant nuclease enzyme: 20 mM Tris, 500 mM NaCl, pH 8.0. A salt-tolerant nuclease was added along with 5 mM magnesium chloride and the mixture was incubated at room temperature for 16 hours. Tangential flow filtration was resumed to remove histones liberated by digestion of host cell DNA, to eliminate DNA fragments and nucleotides, and to equilibrate the sample for capture on a column bearing TREN-magnesium complexes. The sample was applied to the column and processed as described in example 2. A portion of the TREN fraction containing full capsids was further fractionated on a primary amine anion exchanger eluted with a pH gradient. Another portion of the TREN fraction was further fractionated on a strong anion exchanger eluted with a salt gradient. Results were compared with another experiment conducted under the same conditions but performing the initial chromatography step on a cation exchanger. FIG. 15 illustrates the full chromatogram from the initial capture step on TREN-Mg. FIG. 16 highlights the elution gradient and cleaning steps from FIG. 15. FIG. 17 highlights anion exchange polishing of the full capsid fraction from capture by TREN-Mg. FIG. 18 compares anion exchange polishing results of the AAV initially purified by the method of the invention (panel at right) verus AAV initially purified by cation exchange chromatography (panel at left). Based on relative peak heights, capture by the method of the invention eliminated 83% more empty capsids than capture by cation exchange chromatography. This reduced overlap between the two empty and full peaks, with the result that polishing by anion exchange chromatography was able to achieve more efficient reduction of empty capsids. FIG. 19 compares empty capsid reduction after TREN-Mg capture (FIGS. 15,16) by a primary amine anion exchanger eluted with a pH gradient (left panel) versus a quaternary amine anion exchanger eluted with a salt gradient (right panel). Both results emphasize the complementarity of the method of the invention with anion exchange chromatography and highlight the potential of using the combination to achieve more effective overall reduction of empty capsid content than either method alone.

Example 8. Integration of the method of the invention into a different multi-step purification process. The method of Example 6 is repeated except replacing the original capture step with a cation exchange chromatography step. The sample is then prepared for processing by the method of the invention and so processed. In one variant of the method, the TREN column is loaded with copper. In another variant of the method, the TREN column is loaded with magnesium.

Example 9. Enhancing removal of DNA and separation of empty and full capsids by combining the method of the invention with another method that can achieve their separation. After processing the sample through the TREN step of Example 6, the full capsid fraction is processed by the known method of separating empty and full capsids on a strong anion exchanger with a salt gradient, as shown in Example 1.

Example 10. Enhancing separation of empty and full capsids by combining the method of the invention with another method that can achieve their separation. After separating empty and full capsids by the method of strong anion exchange chromatography with salt gradient elution, or by the method of primary amine anion exchange chromatography with pH gradient elution, the method of the invention is performed as a further polishing step.

Example 11. Enhancing separation of empty and full capsids by combining the method of the invention with another method that can achieve their separation. A sample containing DNA, empty capsids, and full capsids is first captured by affinity chromatography. The AAV fraction eluted from the affinity column is processed by the method of the invention to remove excess DNA and separate empty capsids from full capsids. In a variation, the sample is treated in advance of affinity chromatography to reduce the concentration of DNA, for example by any of the methods described in Example 7.

Example 12. Enhancing reduction of DNA and separation of empty and full capsids by processing the sample with an anionic metal affinity solid phase in advance of separating full and empty capsids with a cationic metal affinity solid phase. A sample containing DNA, full and empty capsids is equilibrated to a pH of about 9 and applied to an iminiodiacetic acid (IDA) column loaded with ferric iron. DNA is bound but AAV capsids are not. After treatment, the sample is applied with no further preparation to a TREN-column loaded with magnesium. The empty capsids are separated from the full capsids by an increasing sodium chloride gradient. In one variation of this approach, the IDA solid phase is substituted with a nitrilotriacetic (NTA) acid solid phase. In another variation, the anionic metal affinity solid phase is loaded with manganese. In another variation, the TREN solid phase is loaded with calcium. In another variation, both solid phases are loaded with the same metal species. In one version of the process, the anionic metal affinity solid phase is in the form of a flow-through chromatography device. In a variation, the anionic metal affinity chromatography device is plumbed in series with the TREN column. In another variation, the anionic metal affinity solid phase is in the form or particles that can be added to a sample containing full capsids, empty capsids, and DNA, causing the DNA to bind, after which the particles are removed, bringing the DNA with the. In another variation, the treated sample is processed next by a TREN solid phase. In another variation, the treated sample is processed by a cation exchanger before being processed by a TREN solid phase. In another variation, the treated sample is processed by affinity chromatography before being processed by a TREN solid phase.

Figure 20:
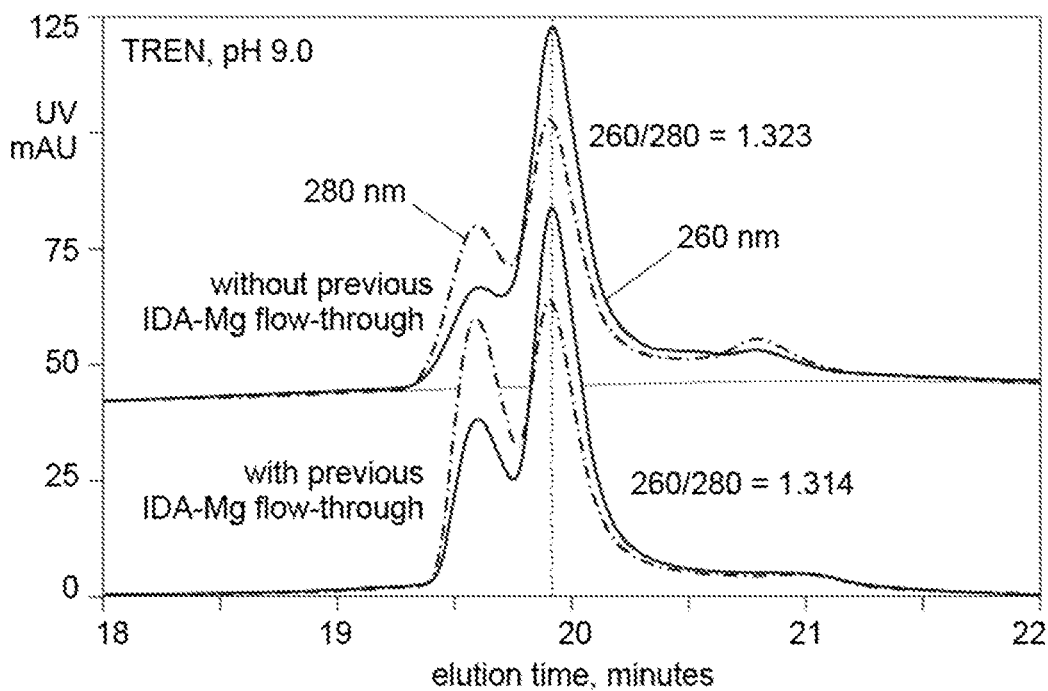
FIG. 20 depicts comparison of AAV separation by the TREN-Mg at pH 9, with and without prior extraction of host cell DNA by magnesium-loaded immobilized iminodiacetic acid.

Example 13. Comparison of AAV separation by the TREN-Mg at pH 9, with and without prior extraction of host cell DNA by magnesium-loaded immobilized iminodiacetic acid. A monolith bearing the anionic metal affinity ligand iminodiacetic acid was loaded with magnesium ions. The monolith was then equilibrated with 50 mM bis-tris-propane at pH 9.0. A sample of cation exchange-purified AAV8 was titrated to pH 9.0. The sample was passed through the monolith. AAV did not bind and flowed through. A large subpopulation of DNA bound and was thereby removed from the sample. The sample was applied to a cationic metal affinity (TREN) monolith loaded with magnesium and eluted with a gradient of increasing sodium chloride. Another sample was prepared from cation exchange-purified AAV by titration to pH 9 but without processing by the magnesium-IDA monolith. The TREN chromatograms are compared in FIG. 20 where it can be seen that pre-treatment by the IDA column altered elution behavior on the TREN column.

Figure 21:
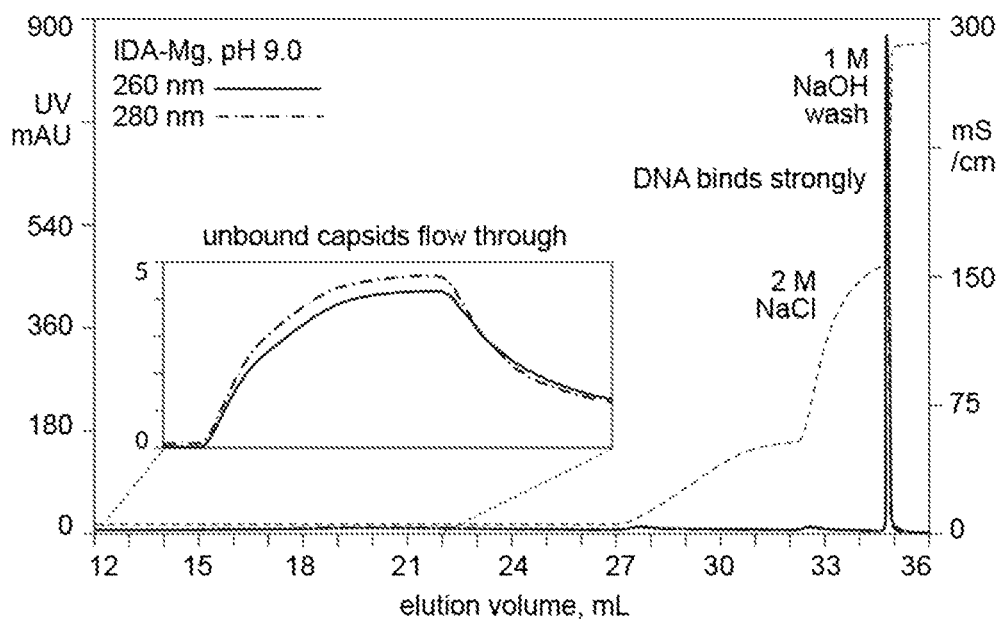
FIG. 21 depicts AAV capsids flow through a magnesium-loaded IDA monolith at pH 9.

Example 14. Advance extraction of host cell DNA. A monolith bearing the anionic metal affinity ligand iminodiacetic acid was loaded with magnesium ions. The monolith was then equilibrated with 50 mM bis-tris-propane at pH 9.0. A sample of cation exchange-purified AAV8 was titrated to pH 9.0. The sample was passed through the monolith. AAV did not bind and flowed through. DNA bound and was thereby removed from the AAV-containing sample. The DNA bound to the IDA column subsequently removed by a cleaning step with 1 M NaOH (FIG. 21).

Figure 22:
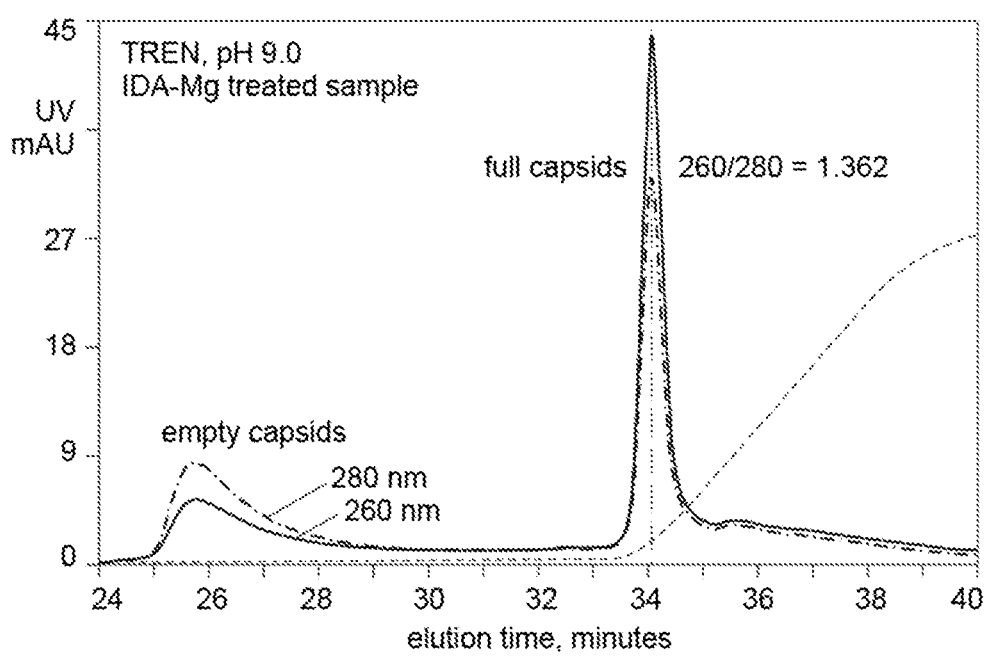
FIG. 22 depicts optimized separation of empty and full AAV capsids by a magnesium-loaded TREN column after a previous DNA extraction step with a magnesium-loaded iminodiacetic acid monolith. After loading capsids on the TREN column, empty capsids were displaced with a 10 mM magnesium chloride wash. Full capsids were eluted with a sodium chloride gradient.

Example 15. Optimized separation of empty and full capsids from a TREN-magnesium column after prior extraction of host cell DNA by an IDA-magnesium column. DNA was extracted from a sample of cation exchange-purified AAV as described in Example 14. The sample was applied to a TREN-magnesium column at pH 9. Empty capsids were washed from the column with 10 mM magnesium chloride. Full capsids were eluted with an increasing salt gradient (FIG. 22).

Example 16. Tandem host cell DNA extraction and separation of empty and full capsids by sequential processing with ferric iron loaded-iminodiacetic acid solid phase then gradient separation by a magnesium-loaded TREN solid phase. An IDA column is loaded with ferric iron and equilibrated to a pH of 9. A TREN column is loaded with magnesium and equilibrated to a pH of 9. The two columns are plumbed together with the IDA column first, then rinsed with buffer at pH 9. A sample containing empty and full capsids and host cell DNA is equilibrated to pH 9. The sample is passed through both columns. DNA binds to the ferric-IDA column. AAV capsids pass through the IDA column and are captured by the magnesium-TREN column. With the columns still plumbed together, both are washed with equilibration buffer, then the TREN column is eluted by an increasing salt gradient which leaves the DNA bound to the IDA column. After collecting the desired full AAV capsid fraction, the columns are cleaned with 1 M NaOH. In a variation of the method, the IDA column is taken offline after the washing step so that the TREN column is eluted independently.

Example 17. AAV purification by anionic and cationic metal affinity with an intermediate tangential flow filtration step. A cell lysate containing AAV8 and host cell DNA is equilibrated to pH 7.0, 100 mM NaCl. Insoluble particles bearing iminodiacetic acid are loaded with ferric iron. The particles are mixed with the cell lysate at a proportion of 5% particles. The sample is incubated mixing for 60 minutes and the particles are allowed to settle to the bottom of the vessel. The supernatant is filtered through a membrane filter with an average porosity of about 0.45 microns. The sample is then diafiltered by tangential flow filtration using membranes with a molecular weight cutoff (MWCO) of 300 kDa. The diafiltration buffer contains 2 mM magnesium chloride, 25 mM bis-tris-propane, pH 9.0. Tangential flow filtration is performed for 6 diavolumes, during which time proteins and lower molecular weight contaminants are eliminated by their passage through the membranes. The sample is applied to a column bearing TREN loaded with magnesium and fractionated under the conditions described in Example 15.

Figure 23:
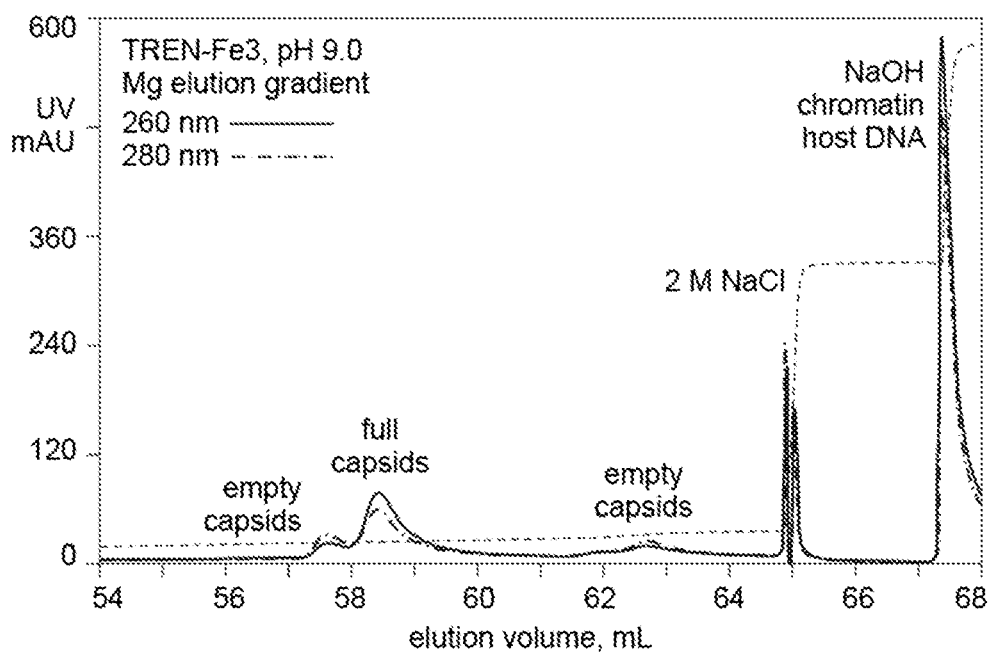
FIG. 23 depicts simultaneous extraction of DNA with separation of empty and full AAV capsids on a ferric iron-charged TREN monolith eluted with a magnesium gradient.

Example 18. Simultaneous DNA extraction and empty/full capsid separation using a cationic metal affinity substrate loaded with ferric iron and eluted with a linear gradient of magnesium chloride. A TREN monolith was charged with ferric iron and equilibrated to 25 mM bis-tris-propane, 1% sucrose, 0.1% poloxamer 188, pH 9.0. Cation exchange chromatography-purified AAV8 capsids still containing host DNA were equilibrated to the same conditions and loaded onto the TREN-Fe monolith. The column was washed with equilibration buffer to rinse out unbound species. The column was then eluted with a 50 CV linear gradient to 25 mM magnesium chloride in 25 mM bis-tris-propane, 1% sucrose, 0.1% poloxamer 188, pH 9.0, and then with a 10 CV linear gradient to 50 mM magnesium chloride in 25 mM bis-tris-propane, 1% sucrose, 0.1% poloxamer 188, pH 9.0. A cleaning step was performed with 25 mM bis-tris-propane, 1% sucrose, 0.1% poloxamer 188, 2.0 M NaCl, pH 9.0, then a stronger cleaning step with 1 M NaOH, 2 M NaCl, pH 13. Results are shown in FIG. 23. A small subpopulation of empty capsids eluted before the main population of full capsids. Another subpopulation of empty capsids eluted long after the full capsids. The initial cleaning step removed a small population of capsid debris and the NaOH step removed a large population of host DNA. Note that these results suggest that iron remained bound to TREN in the presence of magnesium, which suggests in turn that TREN may have a stronger affinity for iron than magnesium.

Example 19. Comparison of IDA-Fe and NTA-Fe as precursors for separation of empty and full capsids by TREN-Fe eluted with a magnesium gradient. IDA particles were loaded with ferric iron and equilibrated to 50 mM Hepes, pH 7. NTA particles were prepared the same way. To one sample of cation exchange chromatography-purified AAV8 particles, IDA-Fe particles were added to a final proportion of 5%. To another sample of cation exchange chromatography-purified AAV8 particles, IDA-Fe particles were added to a final proportion of 5%. The samples were incubated mixing for 120 minutes then the particles were removed by centrifugation. The IDA-Fe treated sample was applied to a TREN-Fe column at pH 7. The column was then re-equilibrated to pH 9.0 (25 mM bis-tris-propane, 1% sucrose, 0.1% poloxamer 188) and eluted with a linear gradient to 50 mM magnesium chloride (in the same base buffer). The column was then cleaned, first with 2 M NaCl, then with 1 M NaOH. The NTA-Fe-treated sample was processed identically. The sample treated with NTA-Fe gave a 260/280 ratio of 3.02 after TREN-Fe eluted with magnesium. The sample treated with IDA-Fe gave a 260/280 ratio of 3.05 after TREN-Fe eluted with magnesium.

Figure 24:
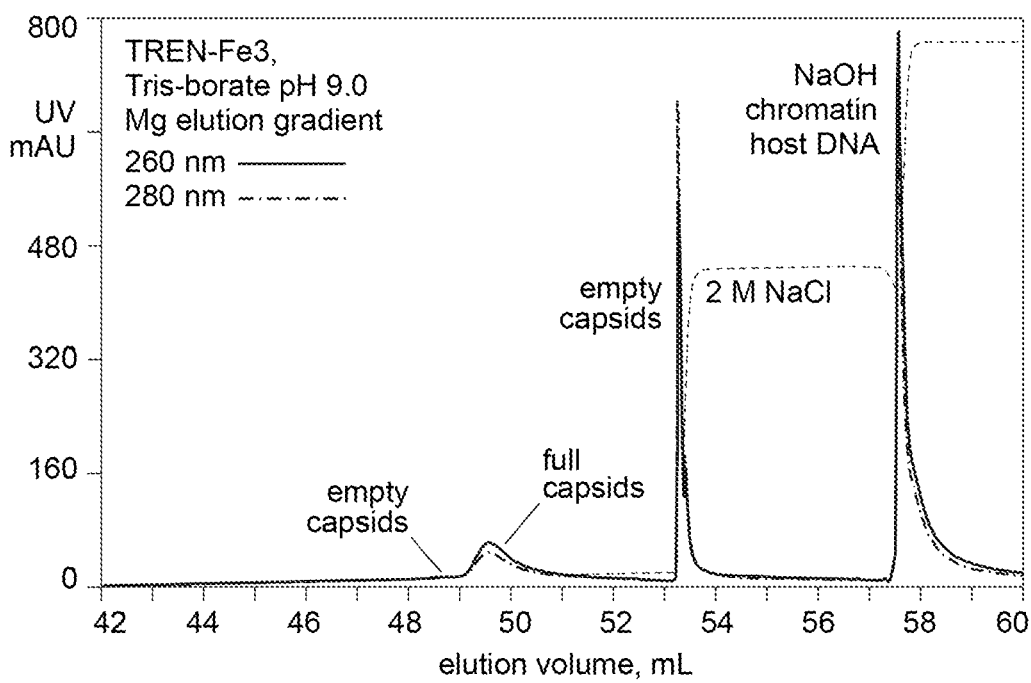
FIG. 24 depicts simultaneous extraction of DNA with separation of empty and full AAV capsids on a ferric iron-charged TREN monolith, equilibrated with a non-metal-containing Tris-borate buffer eluted with a magnesium gradient.
Figure 25:
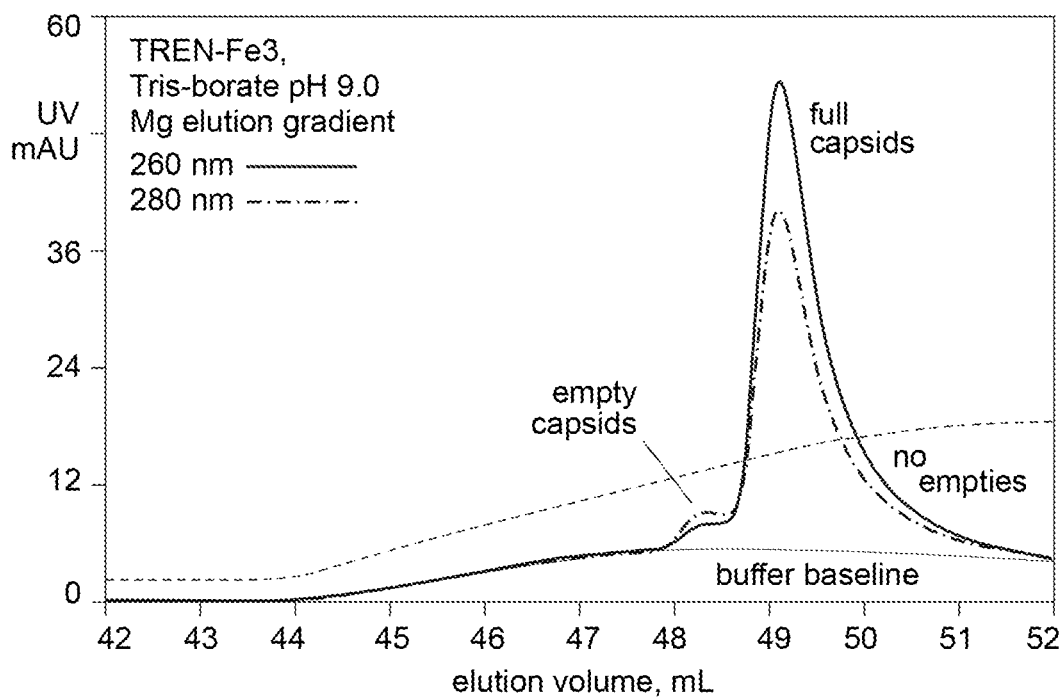
FIG. 25 depicts a zoomed image of FIG. 24 showing simultaneous extraction of DNA with separation of empty and full AAV capsids on a ferric iron-charged TREN monolith, equilibrated with a non-metal-containing Tris-borate buffer eluted with a magnesium gradient.
Figure 26:
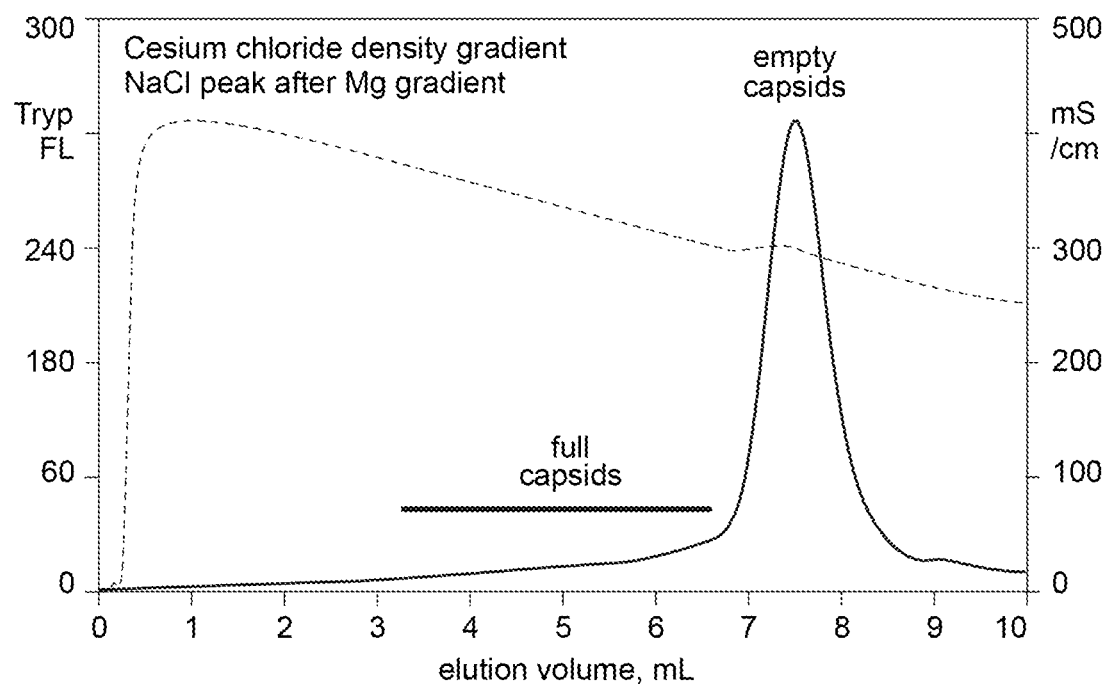
FIG. 26 depicts cesium chloride density gradient fractionation of the contents of the NaCl peak from FIG. 24.

Example 20. Optimization of empty-full capsid separation by the use of borate buffers. A 1 mL TREN monolith charged with ferric iron was equilibrated with 100 mM boric acid, 50 mM Tris, 1% sucrose, 0.01% poloxamer 188, pH 9.0, conductivity 0.25 mS/cm. One part cation exchange-purified AAV8 was diluted in 99 parts 400 mM boric acid, 50 mM Tris, 1% sucrose, 0.01% poloxamer 188, pH 7.0, conductivity 0.76 mS/cm, and loaded onto the column. Flow was restored with equilibration buffer until buffer pH and conductivity stabilized then the column was eluted in a linear gradient to 100 mM boric acid, 50 mM Tris, 50 mM magnesium chloride, 1% sucrose, 0.01% poloxamer 188, pH 9.0, conductivity 9.6 mS/cm. Empty capsids were eluted with a step to 2 M NaCl then the column was cleaned with 1 M NaOH, 2 M NaCl. The complete chromatogram is illustrated in FIG. 24. The region corresponding to elution of the full capsids is zoomed in FIG. 25. The experiment was repeated except substituting the sample dilution buffer with 25 mM Hepes, 1% sucrose, 0.01% poloxamer 188, pH 7.0, conductivity 0.85 mS/cm. Results were essentially identical (not shown). The results shown in FIGS. 24 and 25 contrast dramatically and favorably over all other material and conditions. As shown in FIGS. 2 and 3, an identical sample on a strong anion exchanger eluted with a salt gradient produces a profile characterized by a large empty-capsid peak followed closely by large-full capsid peak. As shown in FIGS. 5, 12, 13, and 22, separation of empty and full capsids on a cationic metal affinity column charged with multivalent metal cations usually produces a profile in which empty capsids begin to elute and partially overlap with the trailing boundary of the full capsid peak. In FIGS. 24 and 25, despite the full capsids eluting in the middle of the gradient, there is only a small empty capsid peak on the leading side of the full capsid peak and no apparent empty capsids on the trailing side of the full capsid peak. Instead, all of the empty capsids, excepting the small first peak in the gradient, elute in the 2 N salt step after the magnesium gradient (FIG. 26). This indicates that their negative charge has been enhanced. This suggests a hypothesis that borate enhances the separation by modification of the negative charge on empty capsids.

Figure 27:
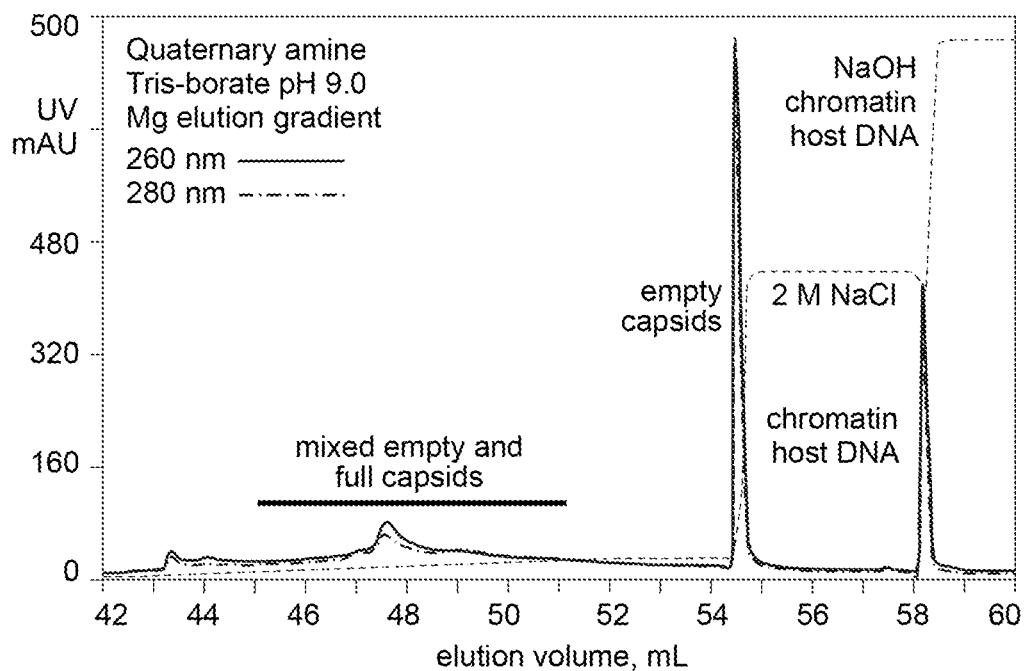
FIG. 27 depicts separation of empty and full AAV capsids on a quaternary amine anion exchange monolith, equilibrated with a non-metal-containing Tris-borate buffer eluted with a magnesium gradient.
Figure 28:
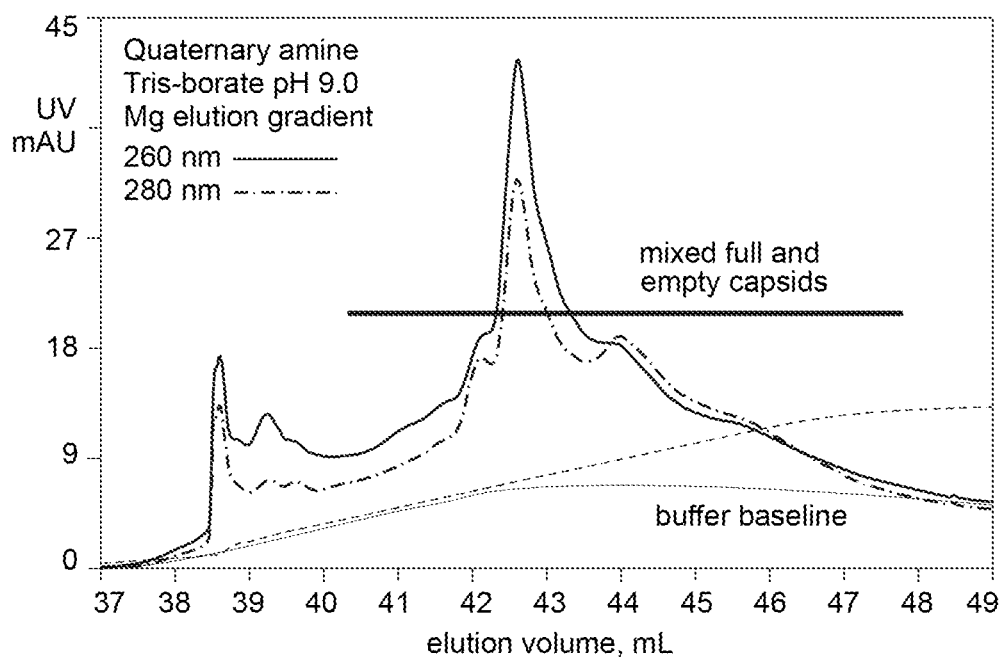
FIG. 28 depicts a zoomed image of the elution gradient from FIG. 27.
Figure 29:
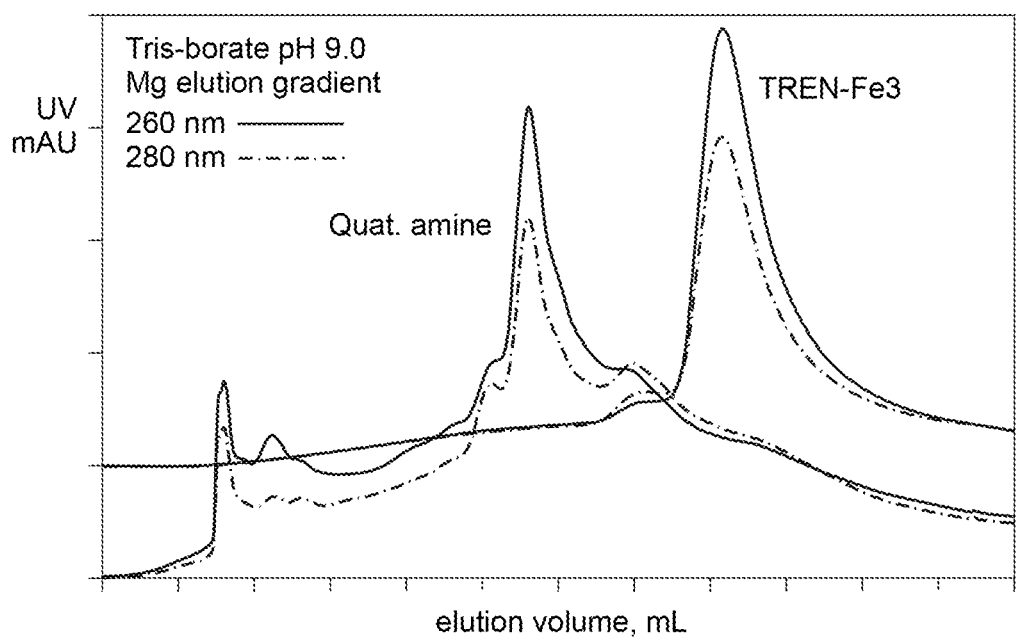
FIG. 29 compares overlaid images of the elution gradient from the TREN-Fe3 monolith shown in FIG. 24 and the quaternary amine monolith shown in FIG. 27.

Example 21. Fractionation of AAV capsids from a quaternary amine (QA) anion exchange monolith. AAV8 capsids were prepared as in example 20. A quaternary amine anion exchanger was equilibrated and eluted as in example 20. The elution profile is illustrated in FIG. 27. Under these conditions, the amount of DNA in the NaOH peak is small compared to the amount in FIG. 27. This documents inferior chromatin removal. In addition, UV absorbance at 260 nm and 280 nm shows that the QA column failed under these conditions effectively separate empty capsids from full capsids (FIG. 28). The results from TREN-Fe3 and QA are compared in FIG. 29. Beyond the obvious difference in relative chromatin extraction and separation of empty and full capsids, the comparison highlights the dramatic difference in the separation chemistry of the method of the invention versus traditional anion exchange chromatography.

REFERENCES

All references cited herein are incorporated by reference to the full extent to which the incorporation is not inconsistent with the express teachings herein.

[1] R Cheung, J Wong, T Ng, Immobilized metal ion affinity chromatography: a review on its applications, Appl Microbiol Biotechnol 96 (2012) 1411-1420.

[2] H Block, B Maertens, A Spriesterbach, N Brinker, J Kubicek, R Fabis, J Labahn, F Schafer, Immobilized-Metal affinity chromatography (IMAC): a review, Met Enzymol 463 (2009) 439-473.

[3] J Koerber, JH Jang, J Yu, R Kane, D Schaffer, Engineering adeno-associated virus for one-step purification via immobilized metal affinity chromatography, Hum Gene Ther 18 (2007) 367-378. www.liebertpub.com/doi/pdfplus/10.1089/hum.2006.139

[4] N Meyer, O Davulcu, Q Xie, M Silviera, G Zane, E Large, Expression and purification of adeno-associated particles in a Baculovirus systems and AAVR ectodomain constructs in E. coli Bio-Protocol 2020 DOI: 10.21769/BioProtoc.3513 bio-protocol.org/e3513

[5] L Tan, D S Kim, I K Yoo, W S Choe, Harnessing metal ion affinity for the purification of plasmid DNA, Chem Eng Sci 62 (2007) 5809-5820.

[6] L Tan, W B Lai, C T Lee, D S Kim, W S Choe, Differential interactions of plasmid DNA, RNA and endotoxin with immobilized and free metal ions, J Chromatogr A 1141 (2007) 226-234.

[7] M Lock, Luc Vandenberghe, J Wilson, Scalable production method for AAV, U.S. Pat. No. 9,198,984B2, Adjusted expiration Aug. 31, 2028.

[8] M Lock, Luc Vandenberghe, J Wilson, Scalable production method for AAV, US Patent US20160040137A1, Anticipated expiration Apr. 4, 2027.

[9] M Lock, M Alvira, Scalable purification method for AAV9, World patent application WO2017160360A9, Priority date Dec. 11, 2015.

[10] B Pappin, M Kiefel, T Houston, Chapter 3. Boron carbohydrate interactions, in Carbohydrates—Comprehensive studies on glycobiology and glycotechnology, C F Chang, ed, InTech Open Ltd, 2012, London.

[11] A Bousher, Review: Unidentate complexes involving borate, J Coord Chem 34 (1995) 1-11.

The invention claimed is:

1. A method for separating full adeno-associated virus (AAV) capsids from empty AAV capsids in a buffered mixture comprising full AAV capsids and empty AAV capsids, the method comprising the steps of
contacting the buffered mixture with a first substrate bearing a metal affinity ligand attached to the first substrate, said metal affinity ligand having the ability to complex metal ions via three or more nitrogen atoms,
separating empty AAV capsids from full AAV capsids by eluting with a pH gradient, a salt gradient, a metal ion gradient or a combination thereof in the presence of multivalent cations bound to the metal affinity ligand to obtain a purified full AAV capsid fraction.

2. The method of claim 1 wherein the first substrate is loaded with multivalent cations prior to contacting the buffered mixture with the first substrate, during contacting the buffered mixture with the first substrate, and/or during eluting.

3. The method of claim 1 wherein the metal affinity ligand of the first substrate is selected from the group consisting of diethyltriamine; triethyltetramine; tetraethylpentamine; polyamidoamine, polytriethylamine, deferoxamine, N,N-bis(2-aminoethyl)-1,2-ethanediamine, and tris(2-aminoethyl)amine (TREN).

4. The method of claim 1 wherein the multivalent metal cation present during eluting is selected from the group consisting of iron(III), manganese(II), copper(II), zinc(II), cobalt(II), magnesium(II), calcium(II), barium(II), nickel(II) and combinations thereof.

5. The method of claim 1 wherein the eluting is performed to a gradient endpoint, and wherein the concentration of multivalent cations at the gradient endpoint is in the range of 0.1 mM to 200 mM.

6. The method of claim 1 wherein the eluting is performed at a pH value in the range of pH 6.0 to pH 10.

7. The method claim 1 wherein the eluting is performed by increasing the concentration of a salt in a range of up to 1 M.

8. The method of claim 1 wherein the eluting is performed by increasing the concentration of a metallic salt in which the metal ion is a multivalent metal cation.

9. The method claim 1 wherein the contacting and/or the eluting is performed with a buffer comprising borate.

10. The method claim 1 wherein the metal affinity ligand is charged with one species of multivalent cations before eluting and the eluting is performed by increasing the concentration of a second species of multivalent metal cation.

11. The method claim 1 further comprising contacting the buffered mixture or the purified full AAV capsid fraction with a second substrate bearing an anionic metal affinity ligand attached to the second substrate, wherein contacting is performed in the presence of multivalent cations bound to the anionic metal affinity ligand, and wherein said anionic metal affinity ligand comprises two or more negatively charged carboxylic acid residues.

12. The method of claim 11 wherein the buffered mixture is treated simultaneously with the first substrate and the second substrate.

13. The method of claim 11 wherein the anionic metal affinity ligand attached to the second substrate is selected from the group consisting of amino-dicarboxylic acids and amino-tricarboxylic acids.

14. The method of claim 11 wherein the anionic metal affinity ligand attached to the second substrate is charged with a multivalent metal cation selected from the group consisting of iron(III), manganese(II), copper(II), zinc(II), cobalt(II), magnesium(II), calcium(II), barium(II), nickel(II) and combinations thereof.

15. The method of claim 11 wherein the contacting of the buffered mixture with the anionic metal affinity ligand attached to second substrate occurs at a pH value in the range of pH 6.0 to pH 10.

16. The method of claim 11 wherein the contacting of the buffered mixture with the second substrate occurs at a salt concentration in a range of up to 1 M.

17. The method of claim 16 wherein contaminating DNA present in the buffered mixture or purified full AAV capsid fraction is removed by binding the DNA to the first substrate and/or the second substrate.

18. The method of claim 1 wherein the multivalent cations are selected from the group consisting of magnesium, calcium, barium, copper, and a mixture thereof.

19. The method of claim 13 wherein the amino-dicarboxylic acids are iminodiacetic acid.

20. The method of claim 13 wherein the amino-tricarboxylic acids are nitrilotriacetic acid.

* * * * *